US006864010B1

(12) United States Patent
McLean

(10) Patent No.: US 6,864,010 B1
(45) Date of Patent: Mar. 8, 2005

(54) APPARATUS OF HIGH POWER DENSITY FUEL CELL LAYER WITH MICRO FOR CONNECTING TO AN EXTERNAL LOAD

(75) Inventor: Gerard Francis McLean, West Vancouver (CA)

(73) Assignee: Angstrom Power (CA)

( * ) Notice: Subject to any disclaimer, the term of this patent is extended or adjusted under 35 U.S.C. 154(b) by 225 days.

(21) Appl. No.: 10/349,136

(22) Filed: Jan. 22, 2003

Related U.S. Application Data

(60) Provisional application No. 60/354,795, filed on Feb. 6, 2002.

(51) Int. Cl.[7] .................................................. H01M 8/04
(52) U.S. Cl. .................................................. 429/39; 429/38
(58) Field of Search ...................................... 429/38, 39

(56) References Cited

U.S. PATENT DOCUMENTS

| 5,631,099 A | 5/1997 | Hockaday | 429/30 |
| 5,759,712 A | 6/1998 | Hockaday | 429/30 |
| 5,861,221 A | 1/1999 | Ledjeff | 429/32 |
| 5,925,477 A | 7/1999 | Ledjeff | 429/32 |
| 6,060,188 A | 5/2000 | Muthuswamy | 429/31 |
| 6,127,058 A | 10/2000 | Pratt | 429/30 |
| 6,312,846 B1 | 11/2001 | Marsh | 429/30 |
| 6,713,206 B2 * | 3/2004 | Markoski et al. | 429/38 |
| 6,727,016 B2 * | 4/2004 | Bostaph et al. | 429/38 |
| 2002/0094471 A1 * | 7/2002 | Mercuri | 429/44 |

FOREIGN PATENT DOCUMENTS

| GB | 2339058 | 1/2000 | ............ H01M/8/00 |
| JP | 8050903 | 2/1996 | |
| WO | WO 01/95406 | 12/2001 | |

* cited by examiner

*Primary Examiner*—John S. Maples
(74) *Attorney, Agent, or Firm*—Buskop Law Group, P.C.; Wendy Buskop

(57) ABSTRACT

The invention is a fuel cell layer for connecting to an external load made of a fuel plenum, an oxidant plenum, a porous substrate connecting the fuel and oxidant plenums, and a plurality of fuel cells, wherein each cell has a distinct channel, two catalyst layers, an anode in one layer and a cathode in the other layer, an electrolyte in the channel to prevent transfer of fuel to the cathode and oxidant to the anode, two coatings on the porous substrate to prevent fuel or oxidant, sealant barriers, and a positive electrical and negative electrical connection disposed on the side of the channel.

39 Claims, 18 Drawing Sheets

APPARATUS OF HIGH POWER DENSITY FUEL CELL LAYER WITH MICRO FOR CONNECTING TO AN EXTERNAL LOAD

The application herein claims priority from the provisional Patent Application No. 60/354,795 with a filing date of Feb. 6, 2002.

FIELD OF THE INVENTION

The present invention relates to fuel cells. More specifically the invention relates to a fuel cell layer comprising multiple cells within distinct channels formed using a single porous substrate.

BACKGROUND OF THE INVENTION

High power density fuel cells have long been desired.

Existing fuel cells generally are a stacked assembly of individual fuel cells, with each cell producing high current at low voltage. The typical cell construction involves reactant distribution and current collection devices brought into contact with a layered electrochemical assembly consisting of a gas diffusion layer, a first catalyst layer, an electrolyte layer, a second catalyst layer and a second gas diffusion layer. With the exception of high temperature fuel cells, such as molten carbonate cells, most proton exchange membrane, direct methanol, solid oxide or alkaline fuel cells have a layered planar structure where the layers are first formed as distinct components and then assembled into a functional fuel cell stack by placing the layers in contact with each other.

One major problem with the layered planar structure fuel cell has been that the layers must be held in intimate electrical contact with each other, which if intimate contact does not occur the internal resistance of the stack increases, which decreases the overall efficiency of the fuel cell.

A second problem with the layered planar structured fuel cell has been to maintain consistent contact between the layers for sealing and ensuring correct flows of reactants and coolants in the inner recesses of the layer structured fuel cell. Also if the overall area of the cell becomes too large then there are difficulties creating the contacting forces needed to maintain the correct fluid flow distribution of reactant gases over the electrolyte surface.

Existing devices also have the feature that, with the layered planar structure fuel cell since both fuel and oxidant are required to flow within the plane of the layered planar structured fuel cell, at least 4 and up to 10 but typically 8 distinct layers have been required to form a workable cell, typically a first flowfield, a first gas diffusion layer, a first catalyst layer, a first electrolyte layer, a second catalyst layer, a second gas diffusion layer, a second flowfield layer and a separator. These layers are usually manufactured into separate fuel cell components and then the layers are brought into contact with each other to form a fuel cell stack. When contacting the layers care must be taken to allow gas diffusion within the layers while preventing gas leaking from the assembled fuel cell stack. Furthermore, all electrical current produced by the fuel cells in the stack must pass through each layer in the stack, relying on the simple contacting of distinct layers to provide an electrically conductive path. As a result, both sealing and conductivity require the assembled stack to be clamped together with significant force in order to activate perimeter seals and reduce internal contact resistance.

The manufacture of the layers for existing fuel cell configurations is often expensive and difficult. The bipolar plates, which serve as oxidant and fuel flowfields as well as the separator are often constructed from graphite which is difficult to machine, adding significant cost to the fuel cell stack. The membrane electrode assembly (MEA) is usually constructed by first coating a solid polymer electrolyte with catalyst on either side and then pressing gas diffusion electrodes onto the electrolyte. The fuel cell assembly requires multiple individual bipolar plates and membrane electrode assemblies to be connected together in a serial manner. Usually discrete seals must be attached between neighbouring bipolar plates and membrane electrode assemblies and the whole stack of sealed bipolar and MEA layers must be held together under considerable compressive force.

A need has existed to develop alternative fuel cell designs that do not perpetuate the approach of assembling discrete layers in a serial manner. One way to meet this need is to build fuel cells using a micro-structured approach wherein microfabrication techniques and nano-structured materials can be combined to create novel devices not subject to the problems commonly associated with conventional fuel cell designs. The application of microscale techniques to fuel cells has a number of distinct advantages. Specifically, the potential for increased power density due to thinner layers and novel geometries, improved heat and mass transfer, improved and/or more precise catalyst utilization and reduced losses with shorter conductive path lengths will all make fuel cells more efficient and enable higher volumetric power densities. The opportunity to include ancillary systems into the fuel cell design and the potential for new applications to emerge present even more potential benefits.

A need has existed for a micro fuel cell capable of low cost manufacturing because of having fewer parts than the layered planar structure fuel cell.

A need has existed for a micro fuel cell having the ability to utilize a wide variety of electrolytes.

A need has existed for a micro fuel cell, which has substantially reduced contact resistance within the fuel cell.

A number of prior inventions have used microscale-manufacturing techniques with fuel cells. U.S. Pat. No. 5,861,221 presents a 'membrane strip' containing a number of conventional MEAs connected to each other in series by connecting the edge of the negative electrode of one MEA to the edge of the positive electrode of the next MEA. Two configurations are considered. The first constructs the 'membrane strip' by placing the MEAs together in a step-like configuration. The second constructs the 'membrane strip' by combining MEAs end-to-end with electrically conductive regions between them that connect the cells in series. In some follow-up work (U.S. Pat. No. 5,925,477) the same inventors incorporate a shunt between the electrodes to improve the electrical conductivity of the cell. The MEA's themselves are of conventional layered structure design, and the overall edge collected assembly continues to rely on conventional seals between neighbouring MEA's.

U.S. Pat. No. 5,631,099 and U.S. Pat. No. 5,759,721 use similar series connection concepts but apply a number of other microscale techniques to the fuel cell design. By doing so multiple fuel cells are formed within a single structure simultaneously. The fuel cells themselves still reside as layered planar devices mounted onto a carrier, with interconnection between neighbouring fuel cells requiring a penetration of the carrier layer. Most of the techniques discussed in these patents relate to the creation of methanol tolerant catalysts and the application of palladium layers to the catalyst to prevent methanol crossover within the cells.

WO 01/95406 describes a single membrane device that is segmented to create multiple MEA structures. Complex bipolar plates that are difficult to manufacture provide both fuel and oxidants to both sides of the MEA layer. U.S. Pat. No. 6,127,058 describes a similar structure, but instead of complex manifolding of reactant gases, only one reactant is supplied to either side of the MEA layer. Series interconnection of the fuel cells formed within the single MEA layer is achieved through external current collectors arranged around the perimeter of the device providing electrical connection from the top of the MEA layer to the bottom of the MEA layer. Such perimeter electrical connections are inefficient.

Some prior art fuel cells attempt to reduce size and fabrication costs by applying microfabrication techniques. For example the Case Western Reserve University device forms multiple fuel cells on a carrier substrate using thin layer processes similar to those used in printing and semiconductor fabrication (Wainwright et al. "A microfabricated Hydrogen/Air Fuel Cell" 195 Meeting of the Electrochemical Society, Seattle, Wash., 1999). In these designs the fuel cells remain of conventional planar design, with the exception that the fuel cells are built-up on a base substrate. The cathodes must be formed on top of the planar electrolytes and then must be connected to neighbouring anodes with an explicit interconnect.

All the cells presented above use current collection on the edge of the electrode. This significantly increases the internal cell resistance of these cells. Each of these cells are also based on solid polymer electrolytes as this is the only electrolyte that allows for easy manufacture. Furthermore, all of the cells presented above achieve a micro fuel cell design by forming multiple fuel cells within a single electrolyte plane.

The concept of using non-planar electrolytes has been considered in the past. GB 2,339,058 presents a fuel cell with an undulating electrolyte layer. In this configuration a conventional layered MEA is constructed in an undulating fashion. This MEA is placed between bipolar plates. This design increases the active area that can be packed into a given volume. However, this design still relies on the expensive and complicated layered structure with explicit seals and requires compressive force to maintain internal electrical contact and sealing. JP 50903/1996 presents a solid polymer fuel cell having generally planar separators with alternating protruding parts serving to clamp a power generation element (apparently an MEA) into a non-planar but piecewise linear shape. As with GB 2,339,058, this document continues to rely on the expensive and complicated layered structure but this design also puts undue stress on the MEA by forcing it into a non-planar arrangement using the separator plates.

In addition to non-planar designs, some prior art presents tubular configurations. U.S. Pat. No. 6,060,188 presents a cylindrical fuel cell with a single MEA layer formed into a cylinder. Fuel or oxidant is delivered to the interior recess of the cylinder with the other reactant delivered on the exterior. Within this design, each cylindrical structure creates a single cell, with current flowing through the annular cylindrical wall that is the fuel cell. A method of providing series electrical interconnection between fuel cells or of sealing individual fuel cells is not disclosed. This design is reminiscent of tubular designs for solid oxide fuel cells that are well known.

A need has existed to develop fuel cell topologies or fuel cell architectures that allow increased active areas to be included in the same volume, i.e. higher density of active areas. This will allow fuel cells to be optimized in a manner different than being pursued by most fuel cell developers today.

SUMMARY OF THE INVENTION

The present invention relates to a specific fuel cell layer architecture that is of an integrated design in which the functions of gas diffusion layers, catalyst layers, and electrolyte layers are integrated into a single substrate. This integrated design enables simpler manufacturing processes and scaling of the design.

The invention is a fuel cell layer for connecting to an external load made of a fuel plenum, an oxidant plenum, a porous substrate connecting the fuel and oxidant plenums, and a plurality of fuel cells. Each cell has a distinct channel, two catalyst layers, an anode in one layer and a cathode in the other layer, an electrolyte in the channel to prevent transfer of fuel to the cathode and oxidant to the anode, two coatings on the porous substrate to prevent fuel or oxidant, sealant barriers, and a positive electrical and negative electrical connection disposed on the side of the channel.

When a plurality of microscopically dimensioned fuel cells are formed within a single substrate higher overall power densities can be achieved. In addition, the multiple fuel cells within the single substrate can be formed in parallel, conducive to the utilization of high volume automated manufacture to construct the fuel cell layer. The combination of fuel cells within a single substrate minimizes the reliance on externally applied seals and clamps.

A number of variations on the design of the fuel cell layer arc envisioned. Some of the variations include having the fuel and oxidant plenums dead-ended, having the fuel cell layer enclosing a volume, having the porous substrate in a non-planar, or alternately planar, configuration and having the fuel cell layer enclose a volume in a cylindrical shape. The substrate can be formed from a variety of conductive and non-conductive porous media.

Dimensionally, the channel can have a dimension ranging from 1 nanometer to 10 cm in height, 1 nanometer to 1 mm in width and from 1 nanometer to 100 meters in length. A single fuel cell of the invention is contemplated of being capable of producing between approximately 0.25 volts and approximately 4 volts.

Between 1 and 5000 fuel cells are contemplated as usable in one fuel cell layer in this design, however in a preferred embodiment, the fuel cell layer has between 75 and 150 joined fuel cells. This fuel cell layer is contemplated to be capable of producing a voltage between 0.25 volts and 2500 volts. A fuel cell with more channels will be capable of producing higher voltages.

Electrolyte usable in this invention can be a gel, a liquid or a solid material. It is contemplated that the electrolyte can be between 1 nanometer and 1.0 mm in thickness, or alternatively simply filling each channel from first wall to second wall without a gap. Having a thin channel, and therefore a thin electrolyte, increases the efficiency of the fuel cell.

The fuel cell layer of the invention can be used by first, connecting a fuel source to a fuel plenum inlet; second, connecting a fuel plenum outlet to a re-circulating controller; third, connecting an oxidant plenum inlet to an oxidant source; fourth, connecting an oxidant plenum outlet to a flow control system, fifth, connecting a positive electrical connection and a negative electrical connection to an external load; sixth, flowing fuel and oxidant to the inlets; and finally, driving load with electricity produced by the fuel cell.

BRIEF DESCRIPTION OF THE FIGURES

A specific embodiment of the invention will be described by way of example with reference to the accompanying drawings, in which.

DETAILED DESCRIPTION OF INVENTION

Figure 1:
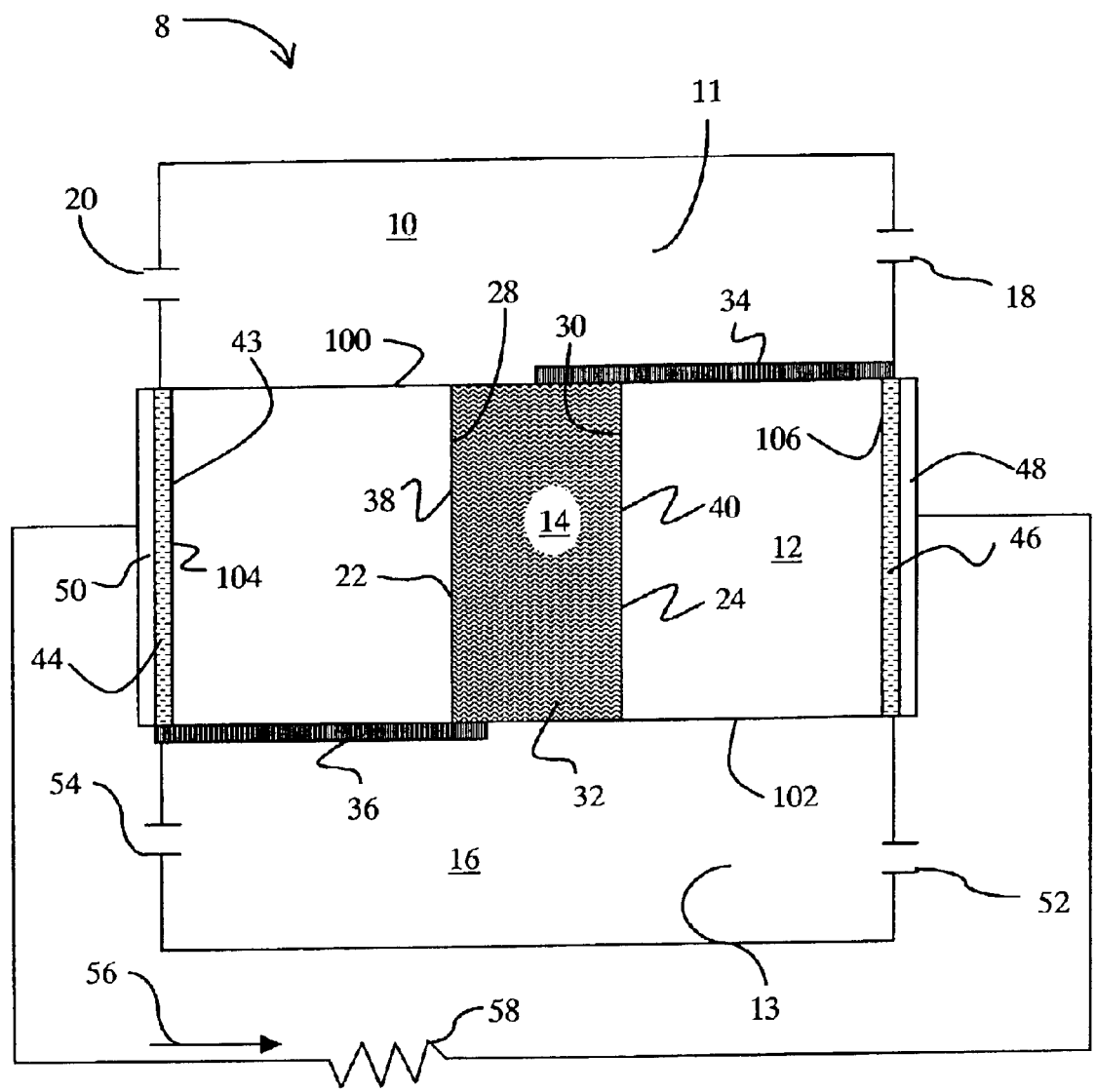
FIG. 1 is a cross-sectional view of a first embodiment of the inventive fuel cell.

The present invention relates to a microstructure fuel cell having a substrate, which is preferably porous, an assembly of fuel cells having a single or multiple substrate structure and methods for manufacturing such fuel cells and fuel cell layers.

The invention relates to a specific fuel cell architecture that is of an integrated design in which the functions of gas diffusion layers, catalyst layers, and electrolyte layers are integrated into a single substrate. This architecture makes it possible to fold together the various 'layers' of which a working fuel cell is formed and produce linear, curvilinear, undulating or even fractal shaped electrolyte paths that allow for higher volumetric power density to be achieved by increasing the electrochemically active surface area. In addition, by forming the various fuel cell layers within a single substrate the problem of simple contacting of fuel cell components to create electrical connections is eliminated, thus creating the potential for lower internal cell resistances to be achieved. The cell layers themselves can be constructed in planar, non-planar or involute configurations providing further advantages in increasing surfaces areas and providing flexibility in applications. This integrated design enables simpler manufacturing processes and scaling of the design.

Unlike existing fuel cell designs, the present invention, in one embodiment, provides convoluted electrolyte layers, which do not smoothly undulate. Other embodiments of the invention include shapes that are essentially non-smooth. Utilizing such non-smooth electrolyte paths allows for greater overall surface areas for the fuel cell reactions to be packed into a given volume than can be achieved when planar electrolyte layers are employed as in conventional fuel cell designs. The present invention also allows for significantly decreased distances between separate electrolyte layers, thereby allow for a greater surface area in a given volume than conventional designs.

The present invention contemplates the use of a design inspired by fractal patterns, which provides long electrolyte path lengths. The invention includes a method for building fuel cells and "stacks" that are not dependent on the layered process and which do not require the post-manufacturing assembly of distinct layered components. The conventional relationship between MEA layers and bipolar plates is eliminated, as is the reliance on multiple discrete layered structures. The invention also contemplates a design with individual fuel cells turned on their side relative to the overall footprint of the assembled fuel cell device. The invention contemplates building multiple fuel cells with an integrated structure on a single substrate using parallel manufacturing methods.

Specifically, it is contemplated to use a porous substrate for the fuel cell through which reactant gas will diffuse with little driving force. The substrate may or may not be electrically conductive. If it is conductive, it is contemplated to insulate at least a portion of the substrate, which typically would separate the anode from the cathode, this insulation may be formed by the electrolyte separating the anode from the cathode and, if necessary, an optional insulating structural member may be added. More specifically, the fuel cell is contemplated to have: (a) a fuel plenum comprising fuel; (b) an oxidant plenum comprising oxidant; (c) a porous substrate communicating with said fuel plenum, and said oxidant plenum further comprising a top, a bottom, a first side, and a second side; (d) a channel formed using said porous substrate, wherein said channel comprises a first channel wall and a second channel wall; (e) an anode formed from a first catalyst layer disposed on the porous substrate of said first channel wall; (f) a cathode formed from a second catalyst layer disposed on the porous substrate of said second channel wall; (g) electrolyte disposed in at least a portion of said channel contacting the anode and the cathode preventing transfer of fuel to the cathode and preventing transfer of oxidant to the anode; (h) a first coating disposed on at least a portion of said porous substrate to prevent fuel from entering at least a portion of said porous substrate; (i) a second coating disposed on at least a portion of said porous substrate to prevent oxidant from entering at least a portion of said porous substrate; (j) a first sealant barrier disposed on the first side and the second sealant barrier disposed on the second side; (k) a positive electrical connection disposed on said first side; (l) a negative electrical connection disposed on said second side; and wherein the resulting fuel cell generates current to drive an external load.

Referring to FIG. 1, which is a cross-sectional view of one embodiment of the invention, a fuel cell 8 has an optional fuel plenum 10 containing fuel 11. A porous substrate 12 is adjacent the optional fuel plenum 10. The fuel plenum can have an optional fuel plenum inlet 18. The fuel plenum can also have an optional fuel plenum outlet 20. An optional oxidant plenum 16 containing oxidant 13 is adjacent the porous substrate 12. The oxidant plenum can have an optional oxidant plenum inlet 52. The oxidant plenum can also have an optional oxidant plenum outlet 54. If no oxidant plenum is used the fuel cell uses the ambient environment as a source of oxidant.

The porous substrate 12 can have a shape that is rectangular, square or orthogonal or alternatively, it can be irregularly shaped. In this embodiment it is pictured as being formed within a single plane, although non-planar substrates or multiple substrate configurations are envisioned.

A channel 14, formed using the porous substrate, can be straight or of arbitrary design. If of arbitrary design the channel is referred to throughout this application as "undulating." If multiple channels are present at least one may be undulating. The channel 14 has a first channel wall 22 and a second channel wall 24. Additionally the porous substrate 12 has a top 100, bottom 102, first side 104 and a second side 106.

Said channel can comprise an undulating channel, a straight channel or an irregular channel. If undulating, the channel can be sinusoidal in shape and if undulating, the channel may be of a shape that is in at least three planes.

An anode 28 is created on or alternately in the surface of the first channel wall 22, although the anode could be embedded in the wall as well. Anode 28 is created using a first catalyst layer 38 on or into the surface of the first channel wall 22.

A cathode 30 is formed on the surface or alternately in the second channel wall 24. Like the anode 28, the cathode 30 could be embedded in the second channel wall 24. Cathode 30 is created using a second catalyst layer 40.

Figure 1A:
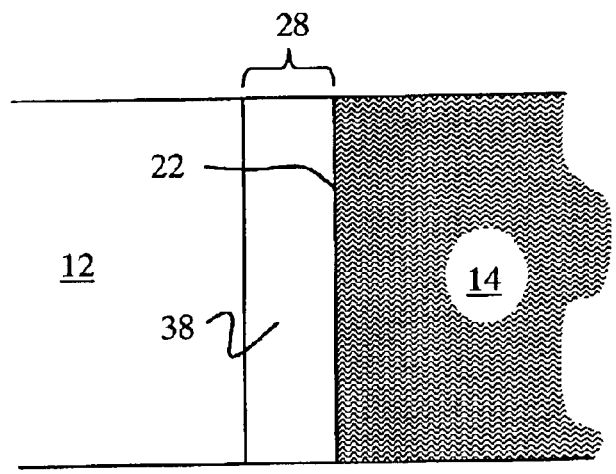
FIG. 1a is a crosssectional detailed view of the anode with the catalyst at a first depth in the porous substrate.
Figure 1B:
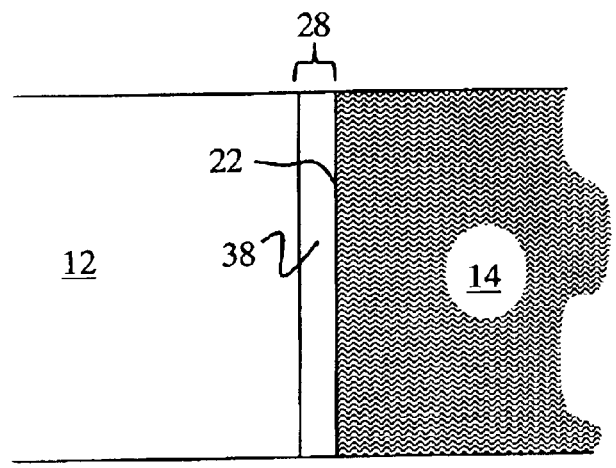
FIG. 1b is a cross sectional detailed view of the anode with the catalyst at a second depth in the porous substrate.
Figure 1C:
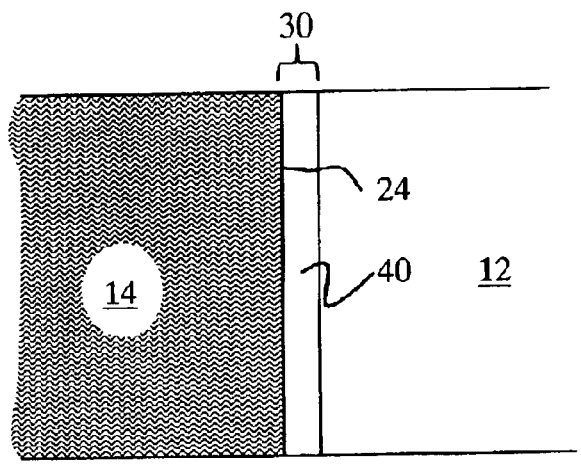
FIG. 1c is a cross sectional detailed view of the cathode.

FIGS. 1a, 1b and 1c provide details of the cathode and anode of the fuel cell. FIG. 1a shows the anode 28 at a first depth within the porous substrate 12, FIG. 1b shows the anode 28 at a second depth within the porous substrate 12 and FIG. 1c shows the cathode 30.

The catalyst layers can be deposited on the first and channel walls or can be formed in the channel walls. In one embodiment the first and second catalyst layers are disposed in the porous substrate to at least a minimum depth to cause catalytic activity.

Referring back to FIG. 1, an electrolyte 32 is disposed in the channel 14.

A first coating 34 is disposed on at least a portion of the porous substrate 12 preventing fuel from entering at least a portion of the porous substrate 12. A second coating 36 is disposed on at least a portion of the porous substrate 12 preventing oxidant from entering at least a portion of the porous substrate 12.

A first sealant barrier 44 is disposed on the first side of the porous substrate and a second sealant barrier 46 is disposed on the second side of the porous substrate. The sealant barriers can optionally be disposed within a sealant barrier channel 43.

A positive electrical connection 50 is engaged with the porous substrate 12 on the first side of the porous substrate.

A negative electrical connection 48 is engaged with the porous substrate 12 on the second side of the porous substrate.

The resulting fuel cell generates current 56 to drive an external load 58.

Figure 2:
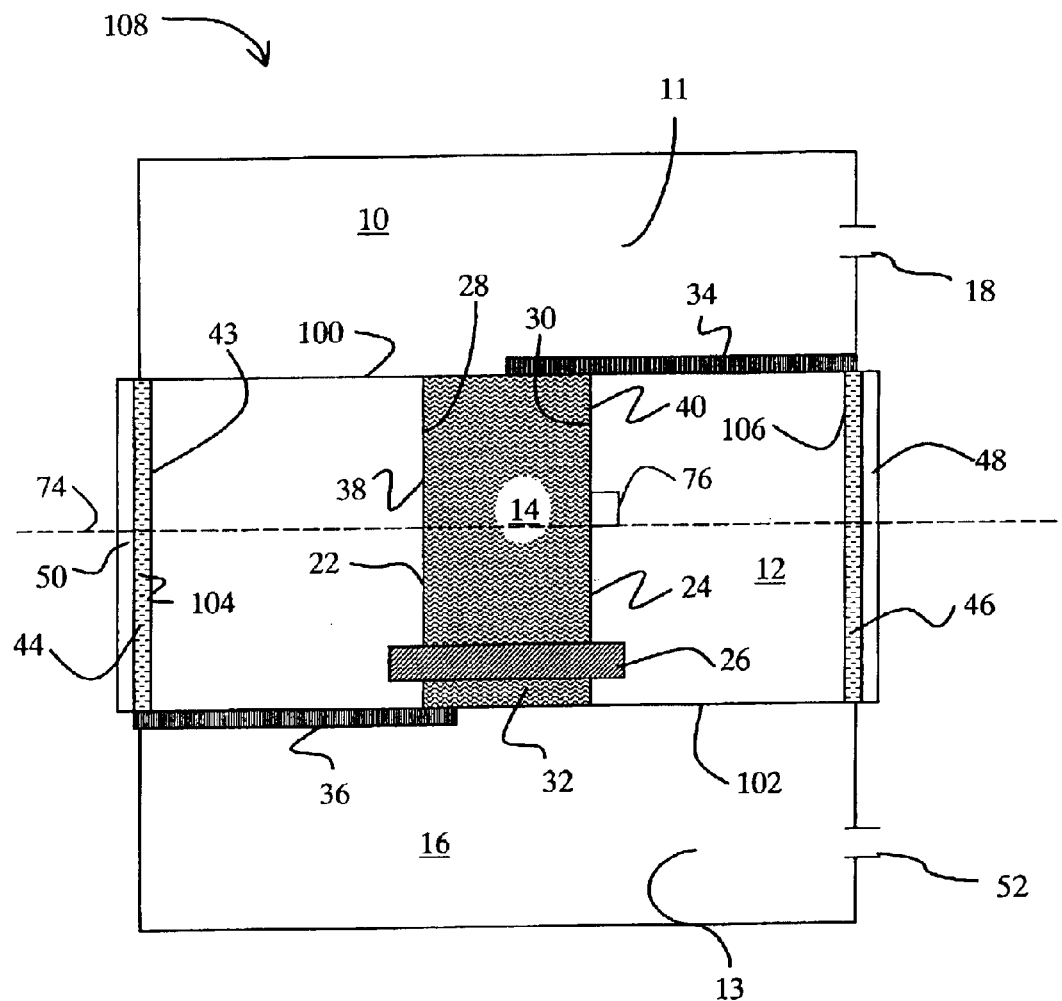
FIG. 2 is a cross-sectional view of a dead ended embodiment of the inventive fuel cell.

FIG. 2 is another embodiment of the invention showing a dead ended version of the fuel cell 108 specifically excluding the fuel outlet 20 and the oxidant outlet 54 of the FIG. 1 embodiment.

In one version of this embodiment of the invention, it is contemplated that the electrolyte 32 can be mounted in the channel 14 at an angle 76, preferable at an angle, which is perpendicular to the longitudinal or horizontal axis 74 of the predominant portion of the porous substrate 12.

Figure 2A:
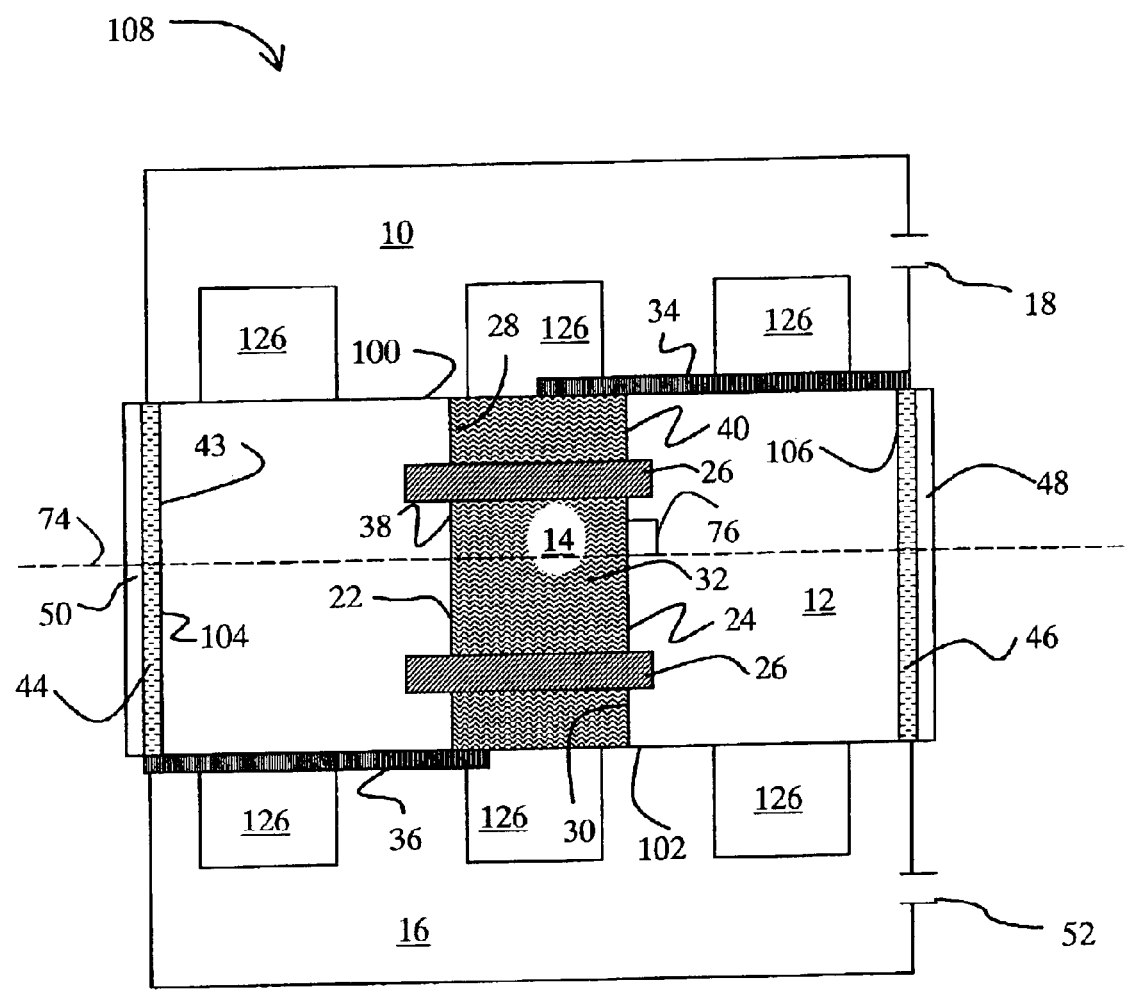
FIG. 2a is embodiment of the fuel cell according to the invention with the fuel and oxidant plenums being solid with flow channels contained therein.

In FIG. 2 an optional support member 26 separates first channel wall 22 from second channel wall 24 however the support member is not required in every embodiment. Some alternatives envision multiple support members as shown in FIG. 2a. Between one and 50, or more support members are contemplated herein.

Now referring to FIG. 2a, a fuel cell is shown with a solid fuel plenum 10 with flow fields 126 and a solid oxidant plenum 16 with flow fields 126. It is also envisioned that the fuel plenum comprises a permeable material containing the fuel. The oxidant plenum can also comprise a permeable material. It is understood that the fuel plenum and oxidant plenum need not be constructed in the same manner and a variety of combinations of oxidant and fuel plenum configurations can be used. The fuel plenum and the oxidant plenum can each have a variety of shapes, round, elliptoid, rectangular or square. It is particularly contemplated that the fuel plenum has a rectangular cross-section.

Figure 3:
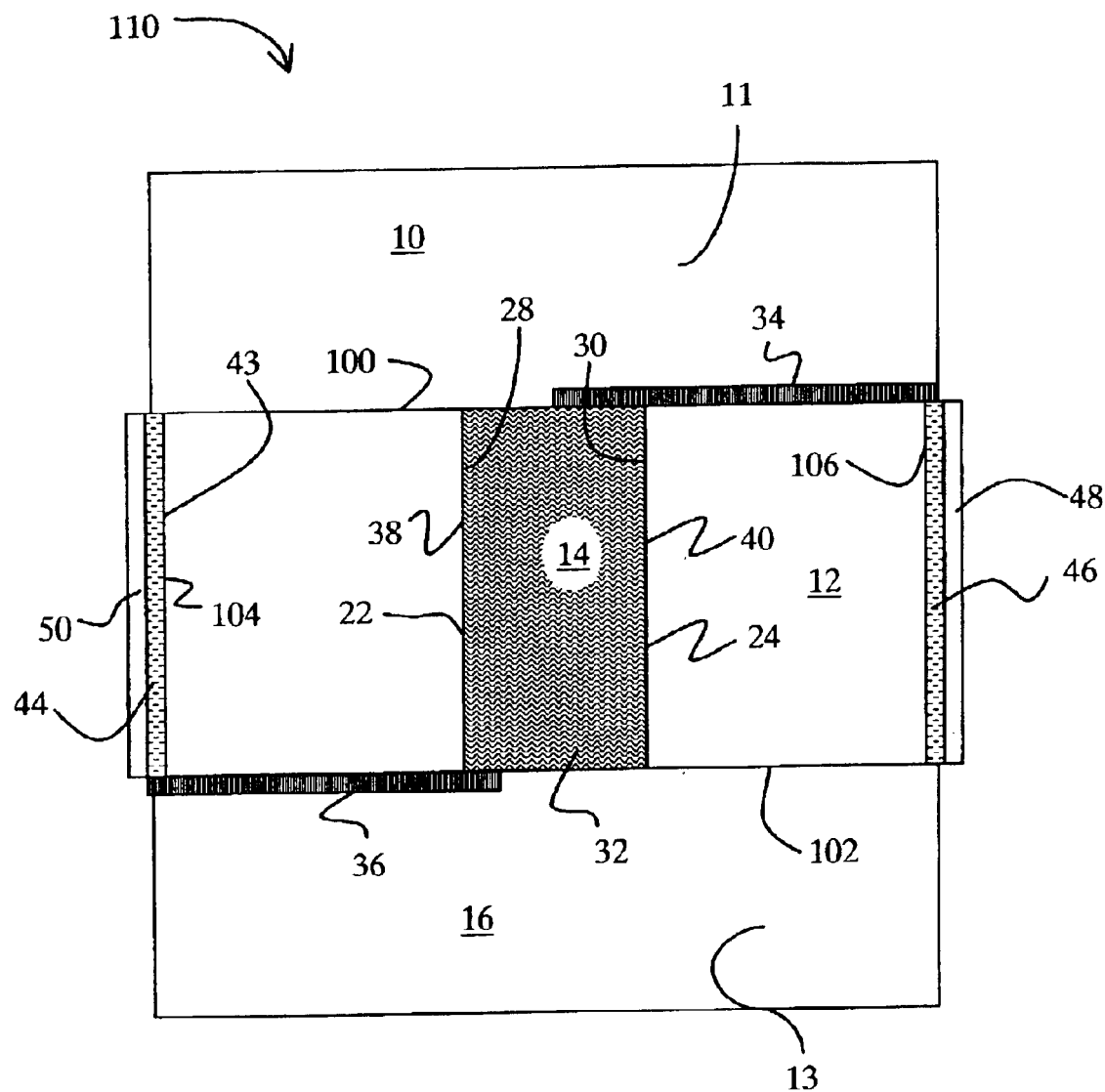
FIG. 3 is a cross-sectional view of another embodiment of a dead ended fuel cell.
Figure 3A:
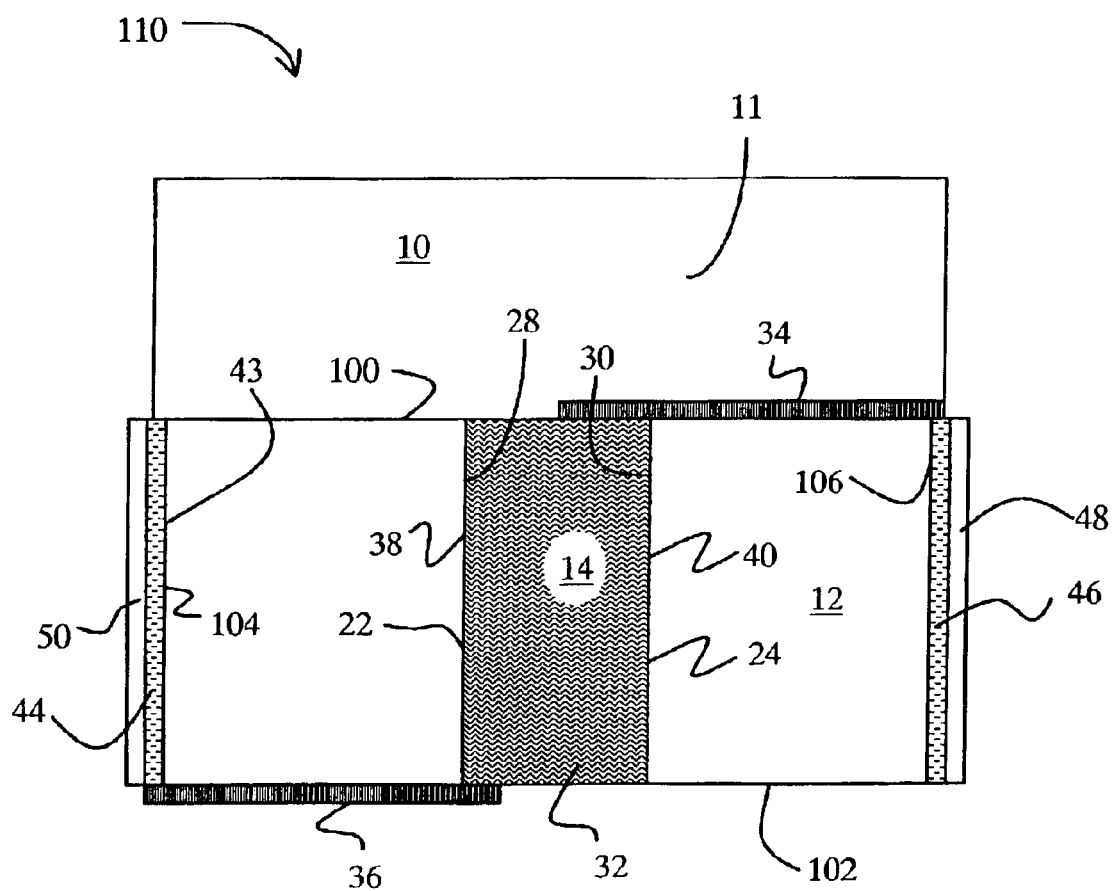
FIG. 3a is an embodiment of the invention with an oxidant plenum open to the ambient environment.
Figure 3B:
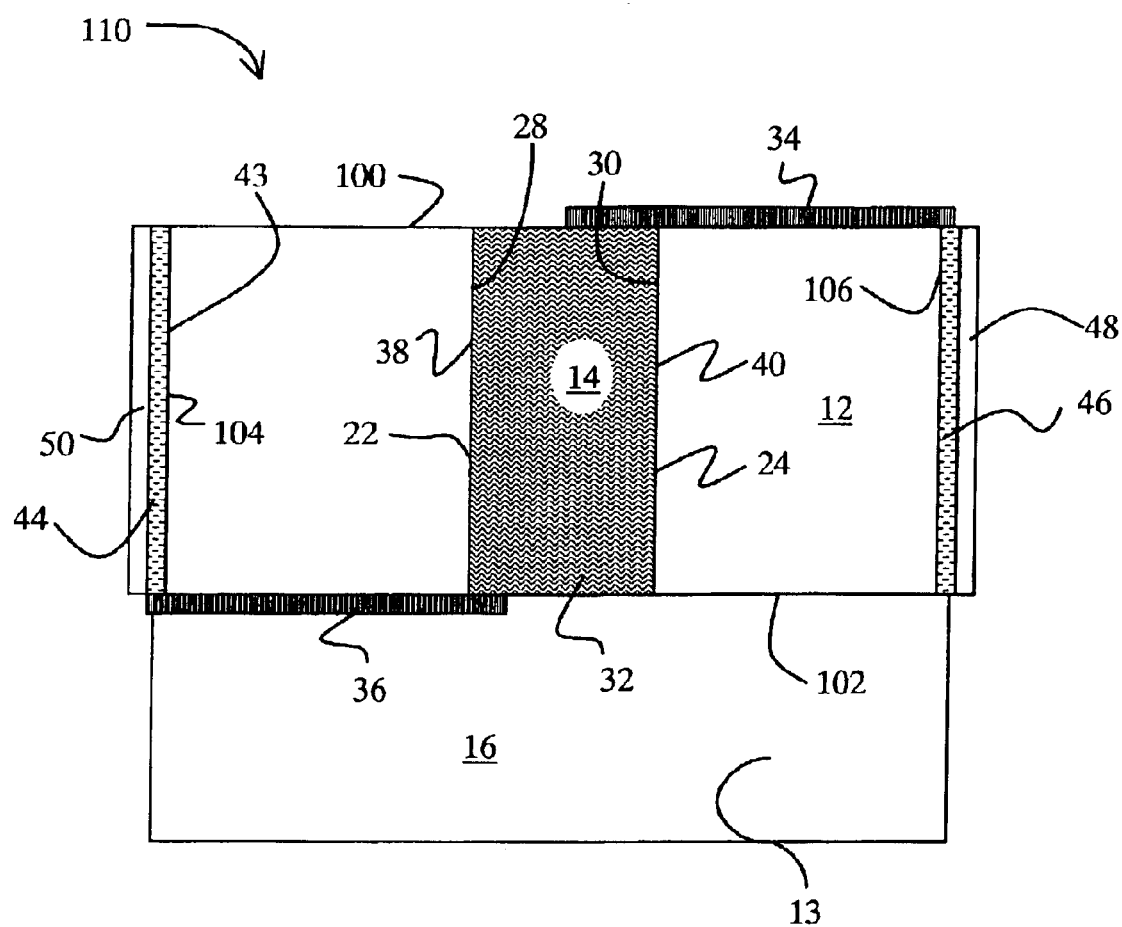
FIG. 3b is an embodiment of the invention with a fuel plenum open to the ambient environment.

FIG. 3 is a cross-section of another embodiment of a dead ended version of the fuel 110 that excludes both the fuel inlet 18 and the fuel outlet 20 as well as the oxidant inlet 52 and the oxidant outlet 54 of the embodiment of FIG. 1. FIG. 3a shows an embodiment of the fuel cell where the oxidant plenum 16 is entirely removed. In such an embodiment the cell would use the ambient environment as an oxidant supply. FIG. 3b shows an embodiment of the fuel cell where the fuel plenum 10 is removed entirely. In this configuration the fuel cell uses the ambient environment as a fuel supply.

Figure 4:
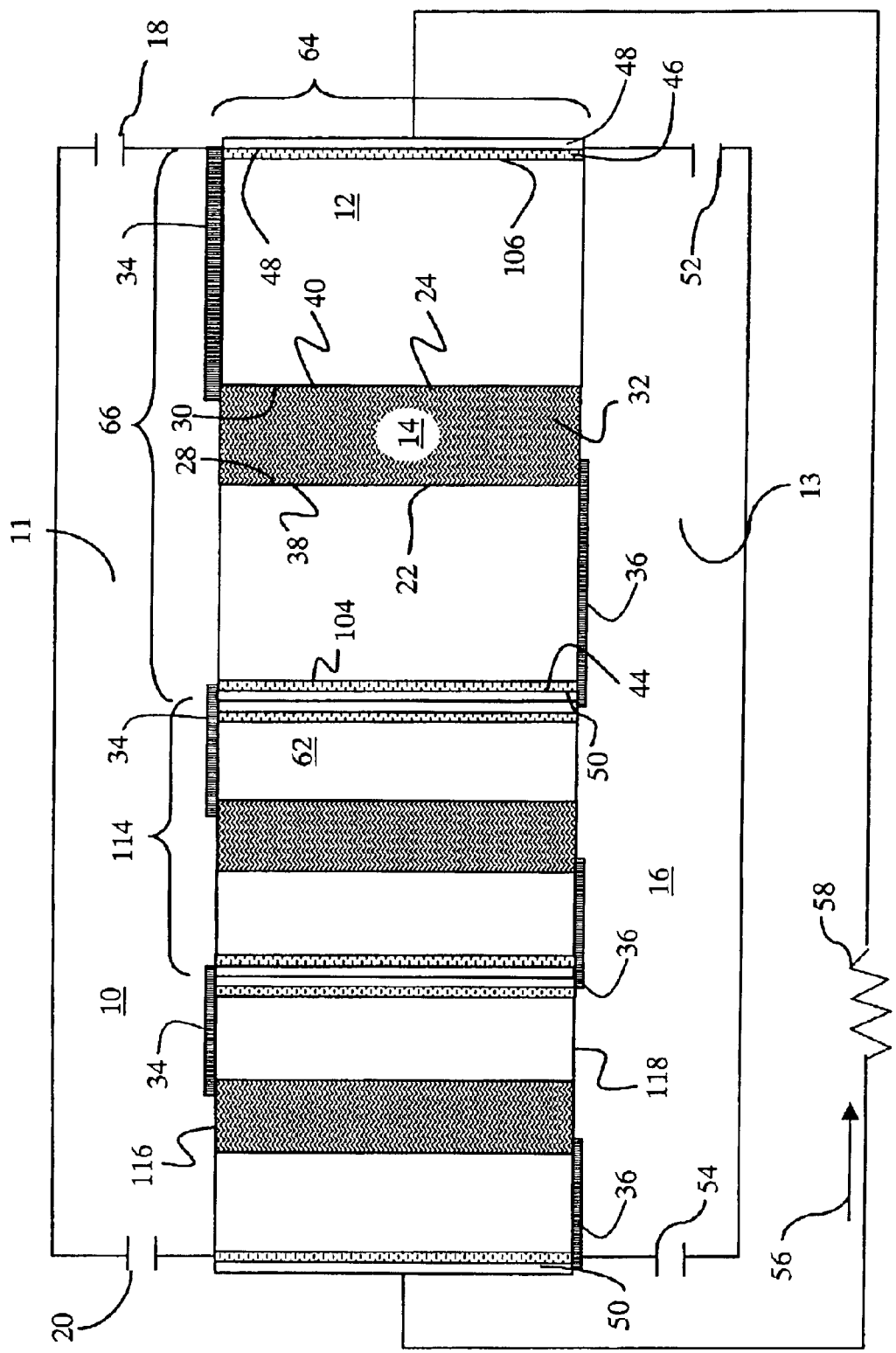
FIG. 4 is a cross-sectional view of a fuel cell layer formed by combining multiple fuel cells of the type described in FIG. 1.
Figure 5:
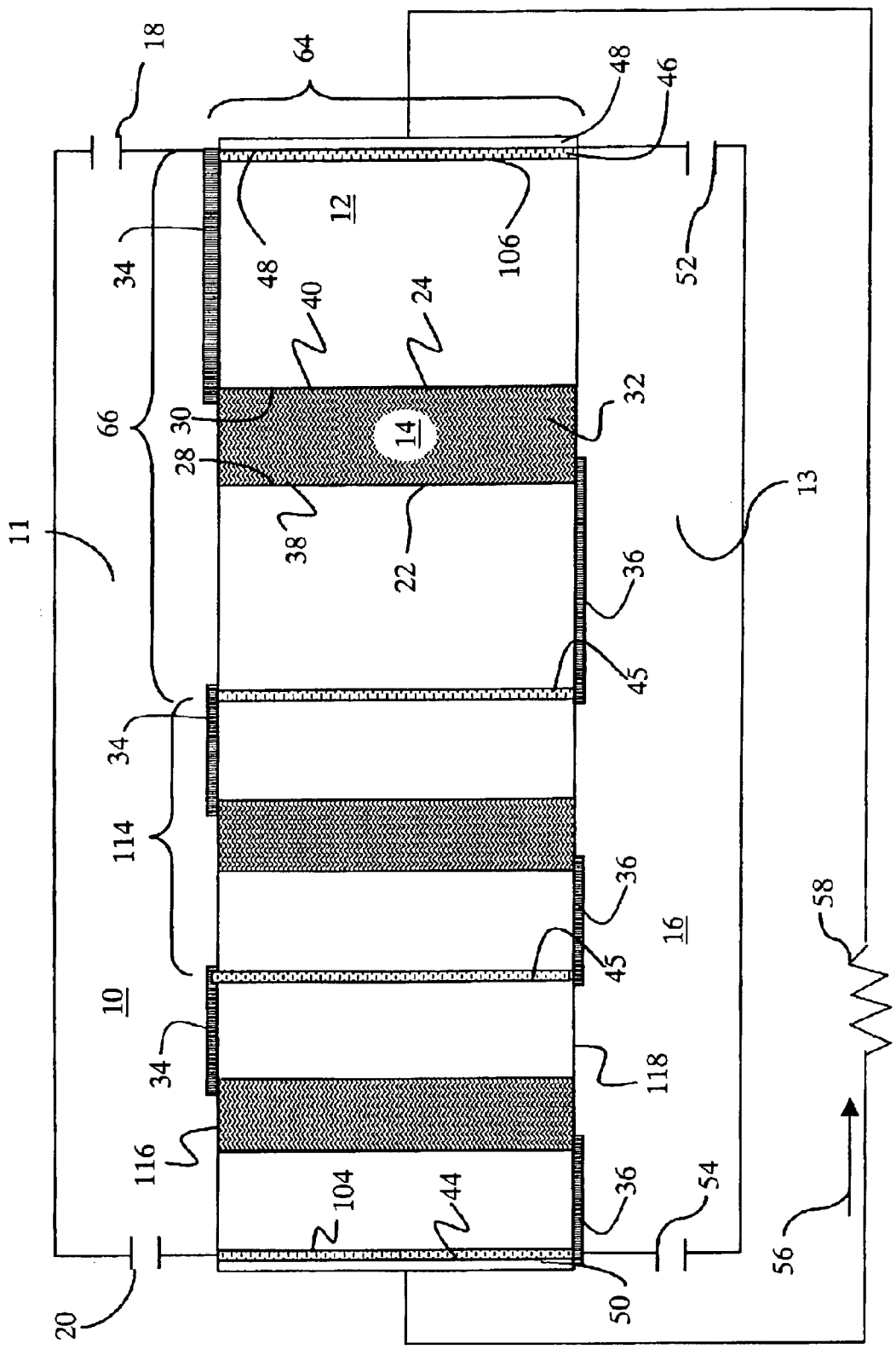
FIG. 5 is a cross-sectional view of a fuel cell with multiple fuel cells of the type described in FIG. 1 formed within a single substrate.

FIG. 4 shows a first fuel cell 66 formed from a substrate 12 that is made adjacent a second fuel cell 114 formed from a second substrate 62. The first and second fuel cells may be formed from either the association of multiple substrates or, as shown in FIG. 5, the first fuel cell 66 and the second fuel cell 114 may be formed by creating multiple channels 14 within a single substrate 12.

In FIG. 4, a plurality of fuel cell structures are formed using separate porous substrates and they are then connected to each other at said sealant barriers 44 forming a fuel cell layer. In this figure a first fuel cell 66 is connected to a second fuel cell 114. Multiple fuel cells can be connected together in this manner to create a fuel cell layer 64 with a fuel side 116 and an oxidant side 118. The details in the figure can be easily understood by referring to the items numbers in the description of FIG. 1 and will therefore not be elaborated here.

In this embodiment it is envisioned that the fuel cell be connected in series, in parallel or in combinations thereof to allow the fuel cell layer to produce current to drive an external load.

Figure 4A:
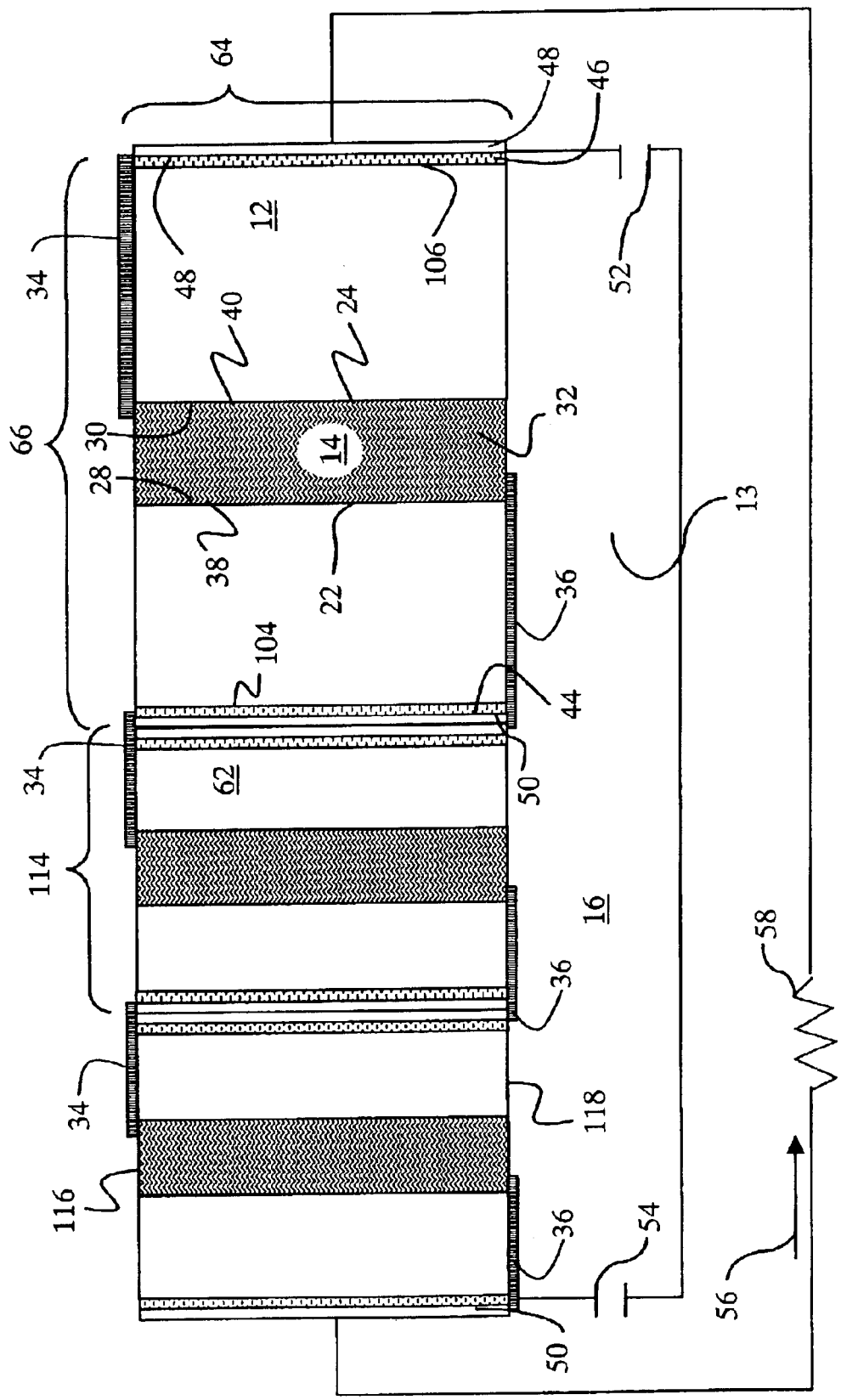
FIG. 4a is a cross sectional view of a multiple porous substrate fuel cell layer with the fuel plenum open to the ambient environment.
Figure 4B:
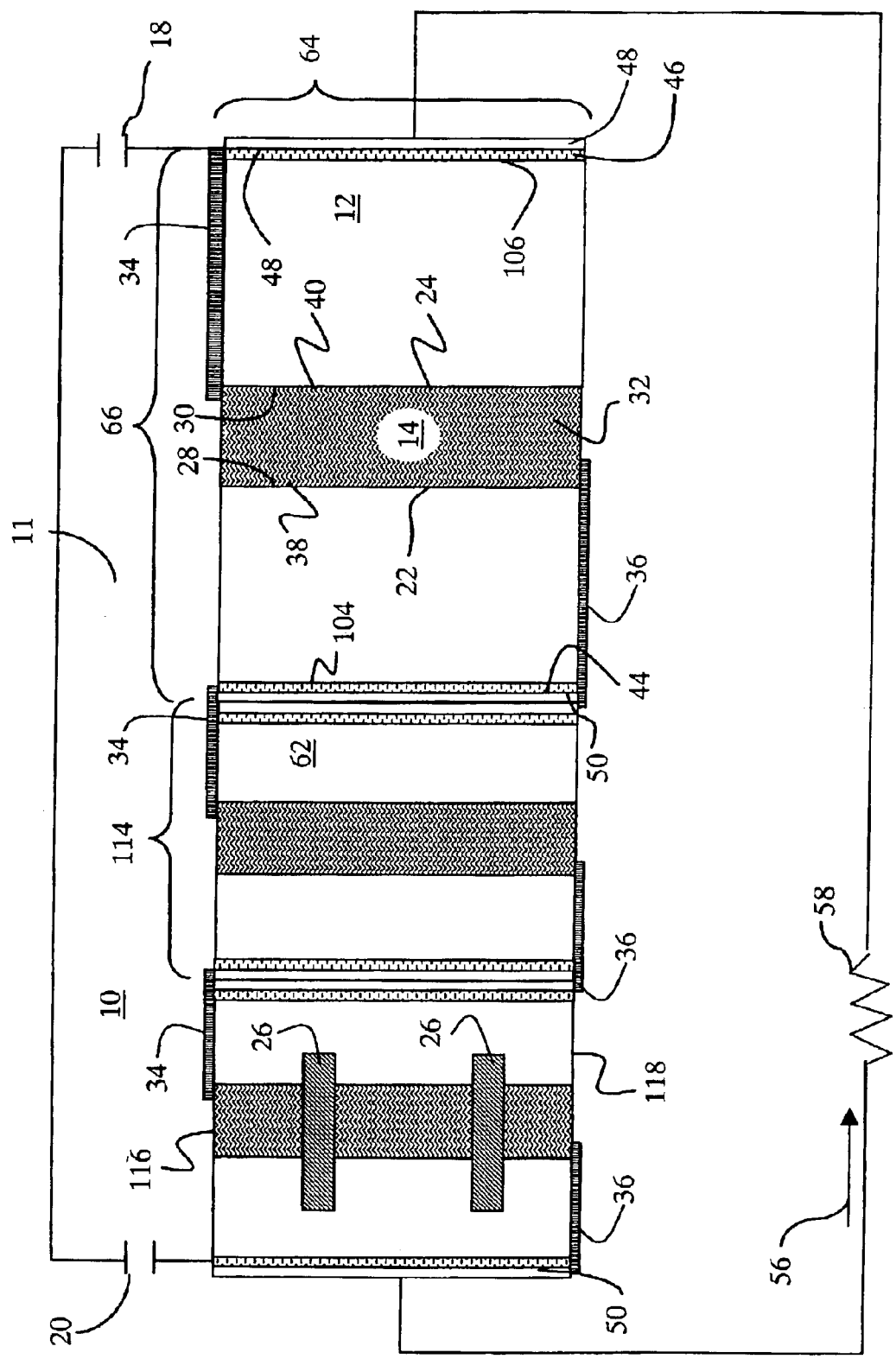
FIG. 4b is a cross sectional view of a multiple porous substrate fuel cell layer with the oxidant plenum open to the ambient environment.

FIG. 4a shows a fuel cell layer with the fuel plenum open to the ambient environment. FIG. 4b shows a fuel cell layer with the oxidant plenum open to the ambient environment. In this figure at least one optional support member 26 is shown on at least one of said fuel cells.

Figure 4C:
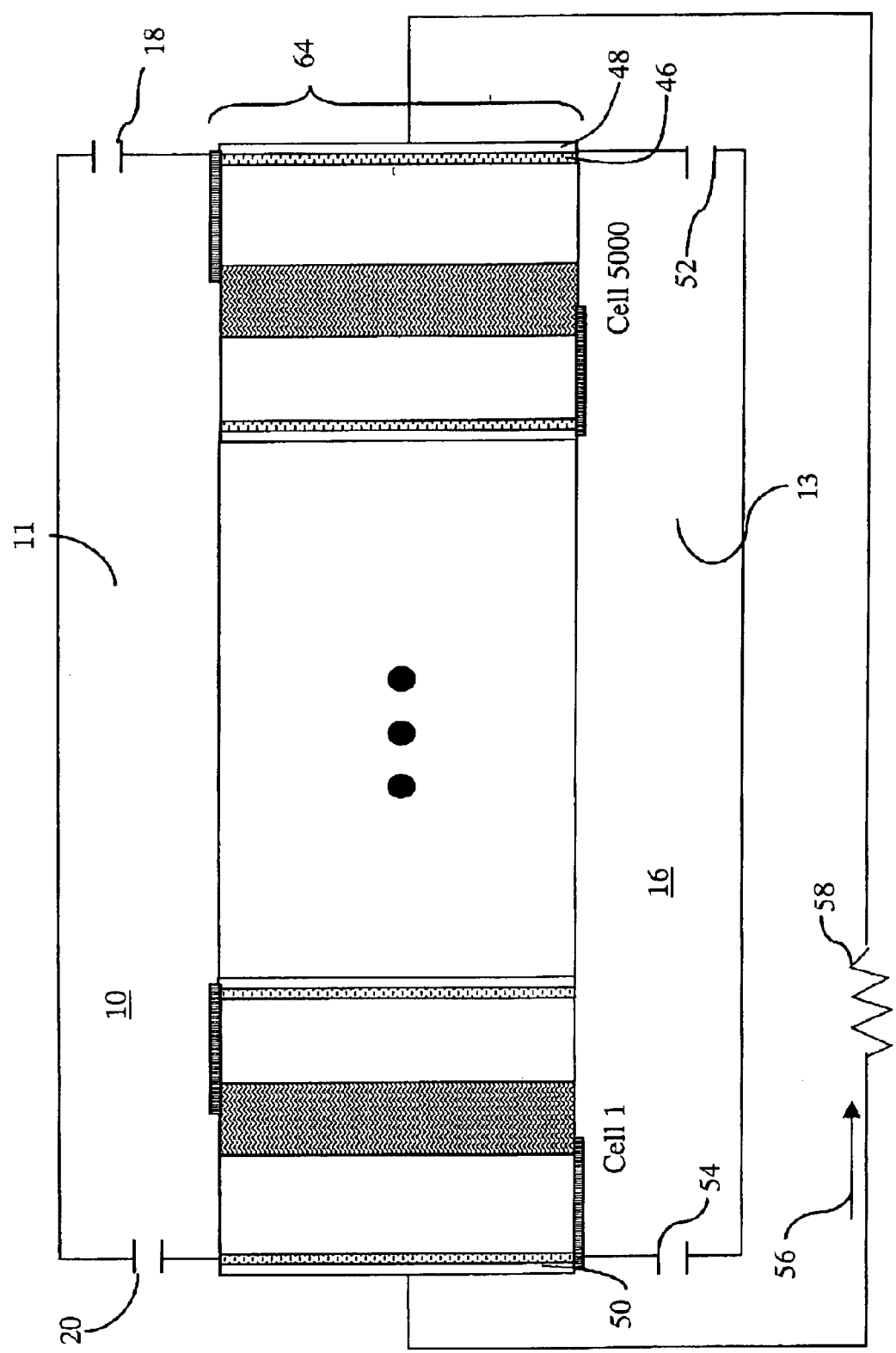
FIG. 4c is a cross sectional view of a fuel cell layer with up to 5000 fuel cells.

FIG. 4c shows an embodiment of said fuel cell layer wherein up to 5000 cells are connected together in the manner explained for FIG. 4.

In FIG. 5, the same fuel cell structures are formed in a single porous substrate 12. In this embodiment a plurality of fuel cells are created within the porous substrate in the same manner as described for FIG. 1. Since, in this case, the fuel cells are formed within a single substrate the sealant barriers and electrical connections associated with each fuel cell are not required. Instead a first sealant barrier 44 is disposed on the first side of the porous substrate, a second sealant barrier 46 is disposed on the second side of the porous substrate and a plurality of third sealant barriers 45 are disposed between said fuel cells. The sealant barriers provide gas impermeable separators between the fuel cells within the fuel cell layer.

It is understood that the same embodiments shown for the multiple substrate structure in FIGS. 4a, 4b and 4c can be used with the single substrate structure shown in FIG. 5.

This association of two fuel cells, either by the structure of FIG. 4 or the structure of FIG. 5, can be extended to place an arbitrary number of fuel cells in association with each other. In both embodiments, the ends of the multiple structures are sealed with a sealant barrier 44 and a second sealant barrier 46. In both embodiments, negative electrical connection 48 is attached on one end of the multiple fuel cell assembly and positive electrical connection 50 is attached on the other end of the multiple fuel cell assembly to allow the multiple fuel cell assembly to drive an external electrical load.

The association of multiple fuel cells produces a fuel cell layer 64 having a fuel side 116 that is brought into association with a fuel plenum 10 and an oxidant side 118 that is brought into association with an oxidant plenum 16.

If the substrate material from which the fuel cells within the fuel cell layer 64 is formed is conductive, then electrical current produced by the individual fuel cells is able to flow directly through the substrate material and the sealant barriers 44 to create a bipolar fuel cell structure within the formed fuel cell layer. If the substrate material from which the fuel cells within the fuel cell layer are formed is not electrically conductive then the first coating 34 and second coating 36 should both be made of an electrically conducting material and formed so that the first coating 34 is in electrical contact with the anode 40 while second coating 36 is in electrical contact with cathode 38. The first coating 34 and the second coating 36 are also made in electrical contact with the conductive sealant barrier 44. In either case, with a conductive or non-conductive substrate the electrical current produced by the fuel cell can be transported to the positive and negative electrical connections.

Figure 5A:
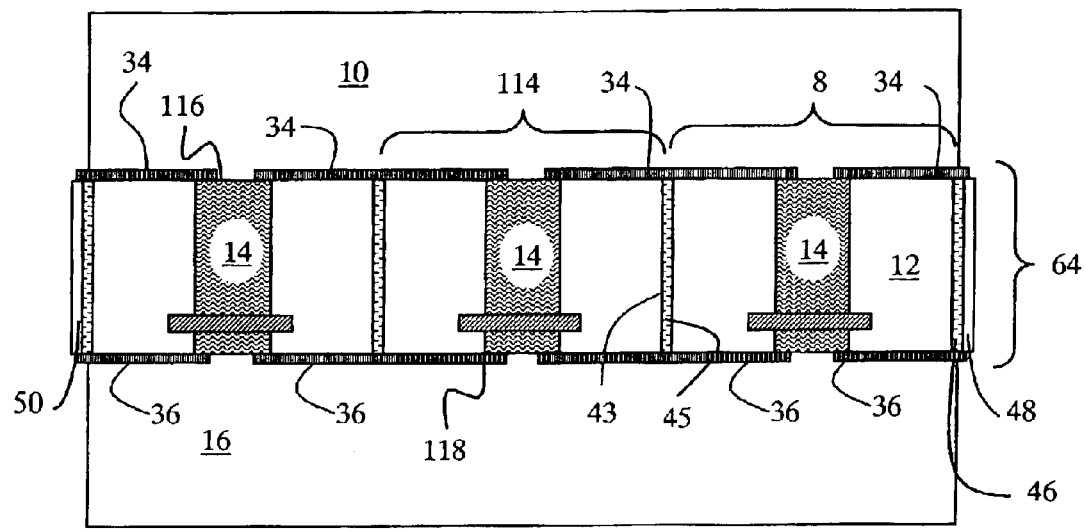
FIG. 5a is another embodiment of a fuel cell with multiple cells.

An alternate configuration for the fuel cell layer is shown in FIG. 5a. In this configuration the first coating 34 is extended to connect the anode of the first fuel cell to the cathode of the second fuel cell. The second coating 36 is likewise extended to contact the anode of the first fuel cell. The first coating on the end and the second coating on the end can be used to connect the fuel cells on the ends to the positive electrical connection 50 and the negative electrical connection 48. In this configuration portions of the first coating are porous to allow fuel to reach the anode and portions of the second coating are porous to allow oxidant to reach the cathode. In this configuration neither the porous substrate nor the sealant barrier need be electrically conductive. It is also envisioned that only the first coating be extended to provide electrical contact between the cells or that only the second coating be extended to provide electrical contact between the cells.

When multiple fuel cells are formed into a fuel cell layer, as described in FIGS. 4 and 5 a series electrical connection of the individual fuel cells results. The summed voltages of the multiple fuel cells produce a potential difference between the positive and negative electrical connections at either end of the fuel cell layer. A larger number of fuel cells will enable the fuel cell layer to produce a higher voltage between the electrical connections. Any combination of conductive or non-conductive substrates, barriers and caps may be used so long as an electrically conductive path between neighbouring anodes and cathodes is created. In this manner either an edge collected or preferably a bipolar series electrical connection of each of the fuel cells in the fuel cell layer is achieved without the need to clamp distinct components together and without the use of independently formed layered components. Also, the direction of current flow in the fuel cell layer is overall in the plane of the fuel cell layer rather than being orthogonal to the fuel cell layer as is the case in most current designs. It is also envisioned to electrically connect the fuel cells within a fuel cell layer together in parallel or in a combination of series and parallel.

Figure 6:
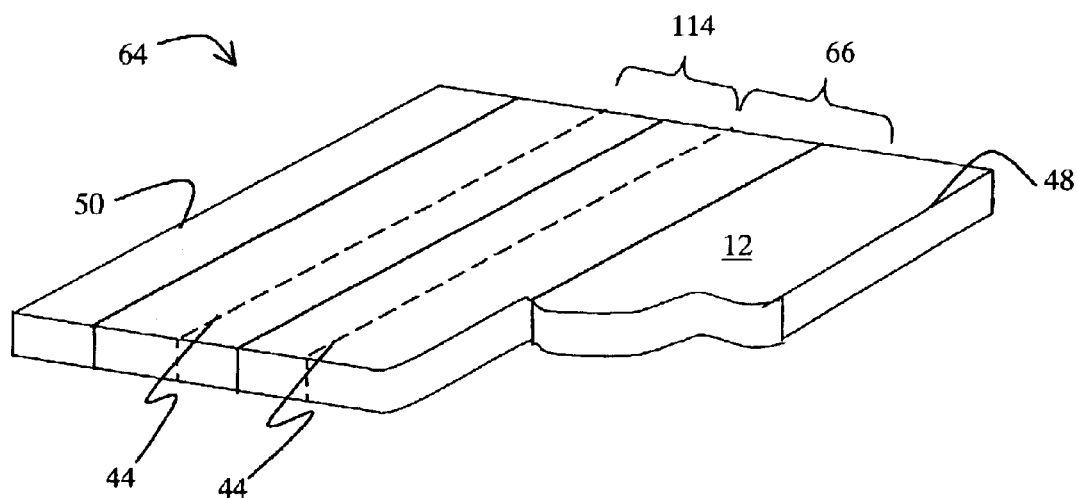
FIG. 6 is a perspective view of a fuel cell layer containing multiple fuel cells of the type described in FIG. 1.

FIG. 6 is a cutaway perspective view of a fuel cell layer 64. In this figure a first fuel cell 66 is separated from a second fuel cell 114 by a sealant barrier 44. A third fuel cell 115 is separated from the second fuel cell 114 by another sealant barrier 44. The layer has the same structure as the layers described in FIGS. 4 and 5. The single fuel cell layer 64 can contain as many sealant barriers and cells as desired. The determination of the spacing between individual fuel cells within the fuel cell layer is at the discretion of the designer, limited by pragmatic issues of manufacturability and mass transport issues within the porous substrate.

The overall structure of the fuel cell layer 64 creates a series connection of the individual fuel cells. Positive electrical connection 50 and negative electrical connection 48 allow an external load to be connected to the fuel cell layer, which produces a voltage that is a multiple of the single cell voltages produced within the fuel cell layer.

Figure 7:
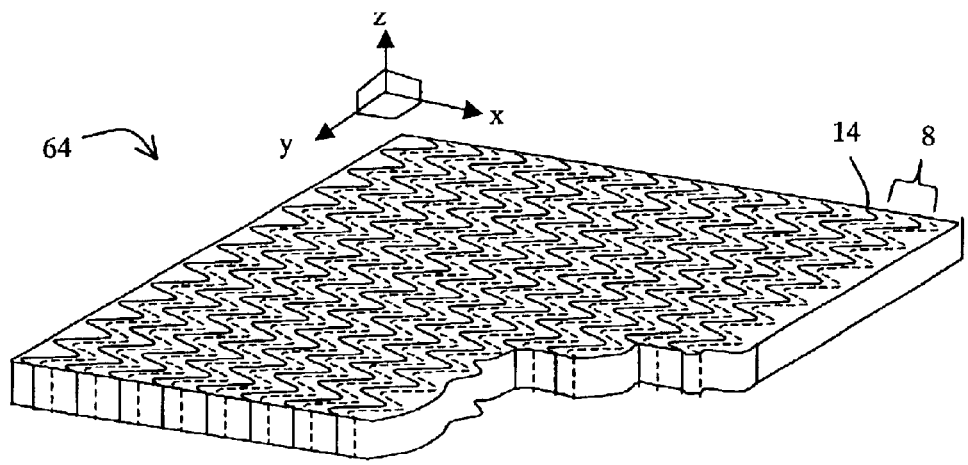
FIG. 7 is another detailed perspective view of the fuel cell of the invention with undulating channels.

FIG. 7 shows a similar view as FIG. 6 of the fuel cell layer 64 but in this Figure, each of the fuel cells 8 have a channel 14 with a less straight structure. Again, as with FIG. 6, FIG. 7 uses essentially the same structure as shown in FIG. 4 and 5, but repeated multiple times creating a multi-cell structure. The less straight structure of the channels allows for increased electrochemically active areas for the anodes and cathodes formed on the channel walls. The less straight channels can be smoothly undulating or can be irregular in shape resembling a fractal structured path which is known to have extremely high area. Any arbitrary channel structure can be used with this invention allowing for the optimization of the area of the electrodes in each fuel cell. A preferred embodiment includes a plurality of thin channels that run parallel to each other and follow an irregular path that folds back on itself in a manner suggestive of a fractal pattern. Another preferred embodiment of the invention includes at least one channel that is in at least three planes.

Figure 8:
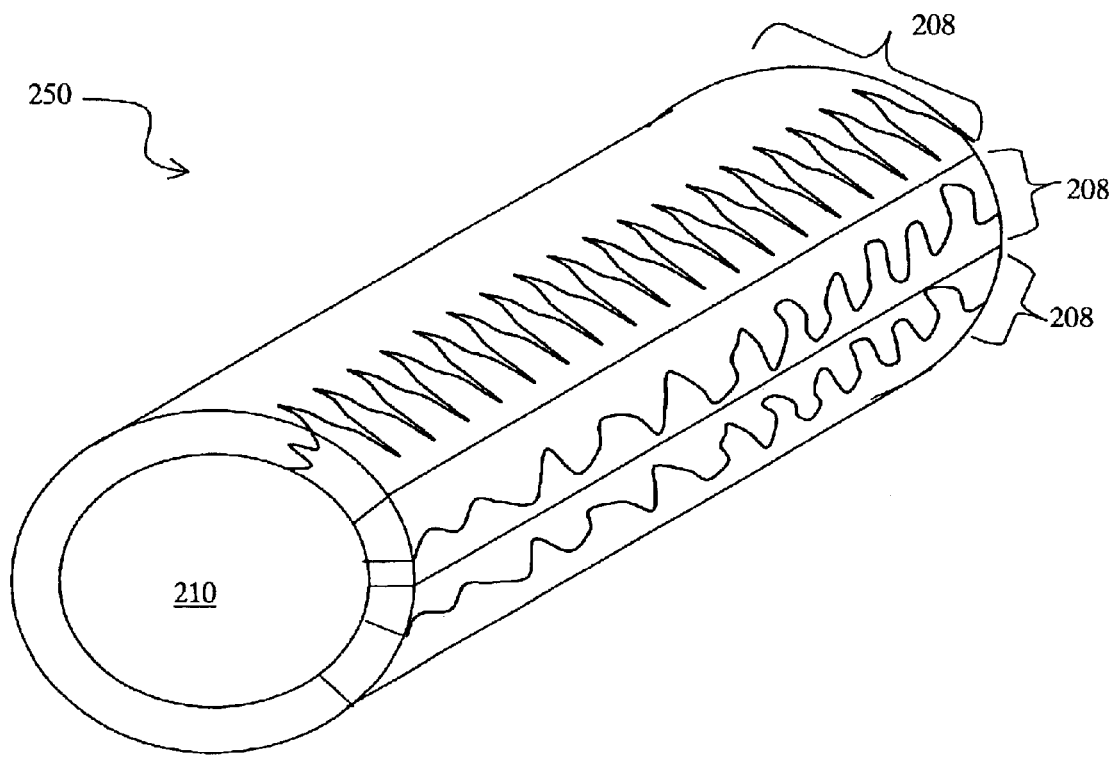
FIG. 8 is a perspective view of a cylindrical version of a fuel cell according to the invention.

FIG. 8 shows a perspective view of a cylindrical version 250 of a multiple fuel cell layer. In this version a multitude of non-planar fuel cells 208 are combined to create a fuel cell layer 64 that encloses a volume 210. The enclosed volume 210 is used as the fuel plenum while oxidant is supplied by the environment outside the cell. It is also envisioned that the fuel be supplied by the environment outside the cylinder and that the enclosed volume 210 be used as an oxidant plenum. The cylindrical fuel cell 250 can either be constructed using a single porous substrate which is in the shape of a cylinder using the method discussed for combining cells in FIG. 5 or with multiple porous substrates that are brought together into a cylinder using the method discussed for combining cells in FIG. 4.

Figure 8A:
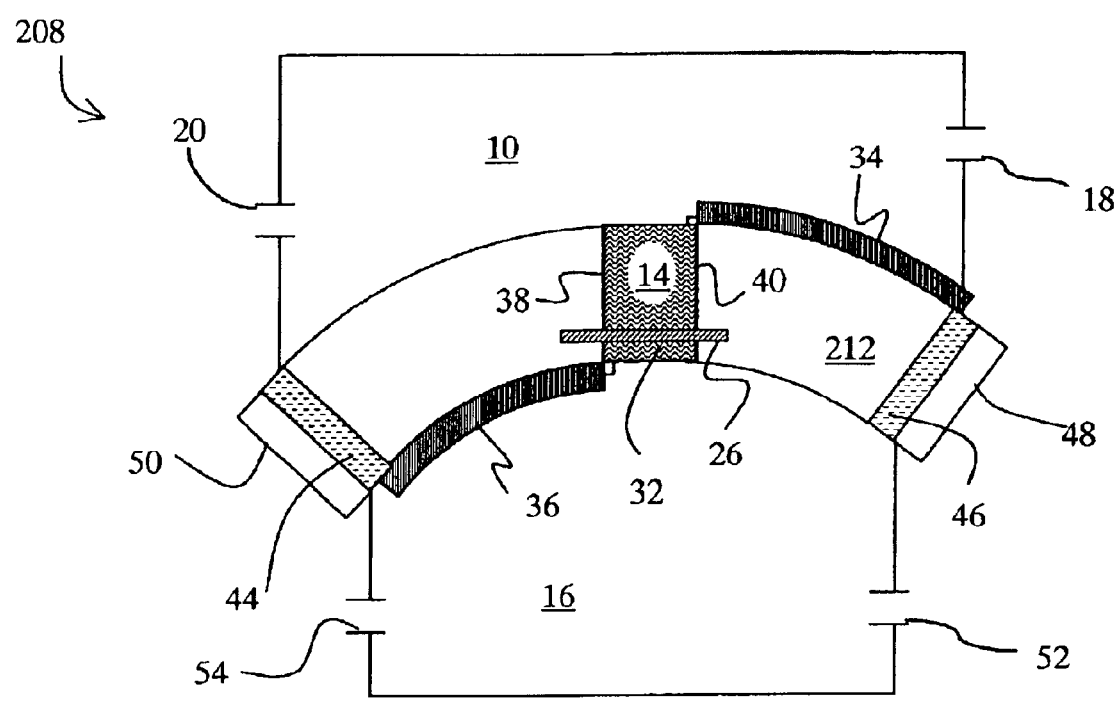
FIG. 8a is a cross-sectional view of an embodiment of the fuel cell of FIG. 1 in which the substrate is irregularly shaped.

FIG. 8a is a cross-section of a non-planar version of the fuel cell 208. The fuel cell has a fuel plenum 10 with fuel inlet 18 and fuel outlet 20 and an oxidant plenum 16 with oxidant inlet 52 and oxidant outlet 54. A non-planar porous substrate 212 is in communication with both the fuel plenum 10 and the oxidant plenum 16. A channel 14 is formed within the non-planar porous substrate 212. The channel 14 has an anode 40 and a cathode 38 constructed as described for FIG. 1 and is filled with electrolyte 32. The fuel cell has a support member 26 a first coating 34 and a second coating 36. The negative electrical connector 48 is shown adjacent sealant barrier 44. The positive electrical connector 50 is shown adjacent the optional sealant barrier 46. Although in this figure an arc is used to show the non-planar nature of the fuel cell, any arbitrary configuration could be used. As with the fuel cells of FIG. 1 the non-planar fuel cell can be combined to form a non-planar fuel cell layer with multiple cells and can be associated with fuel and optional oxidant plenums of various configurations.

Figure 9:
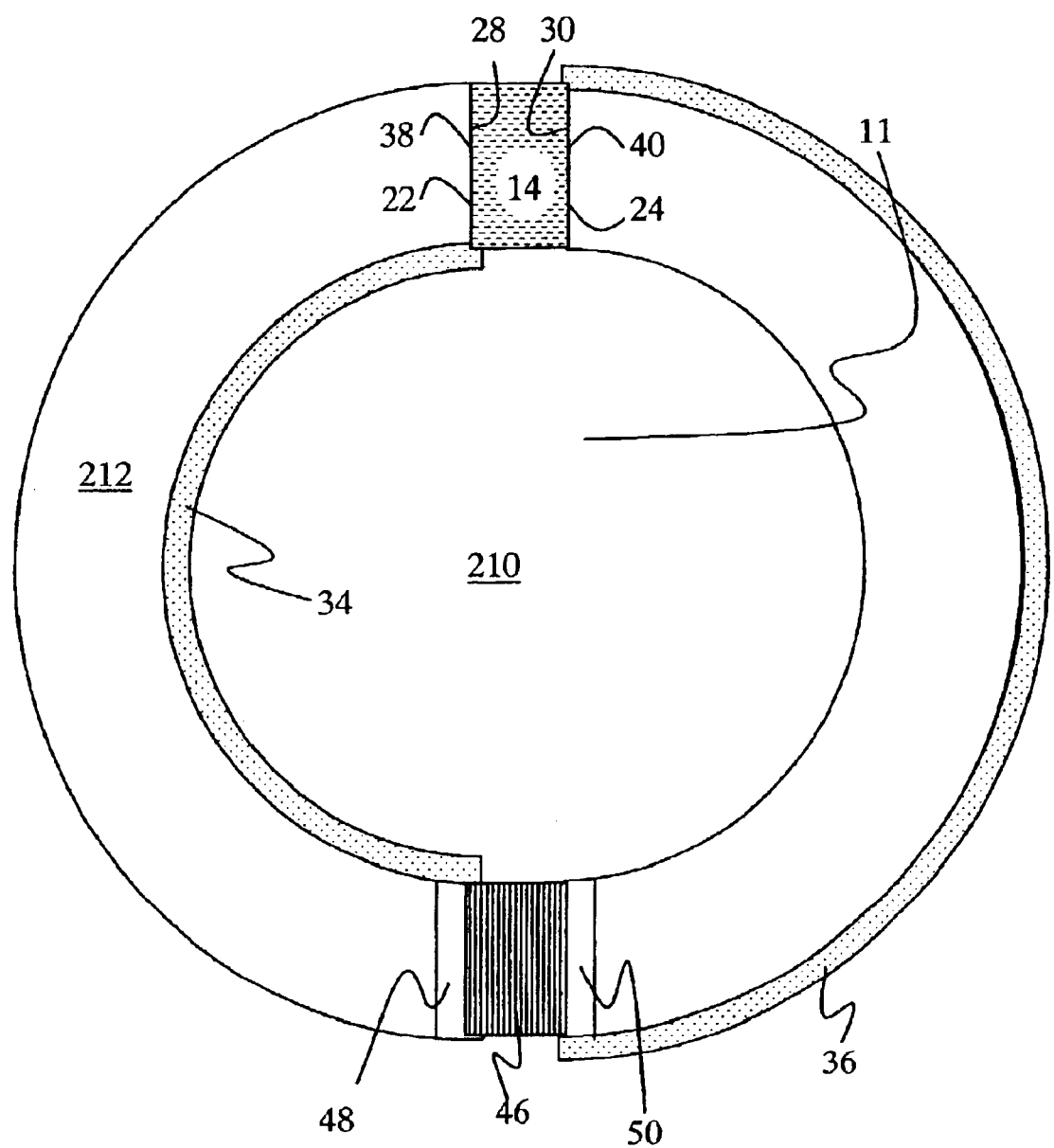
FIG. 9 is a cross sectional view of a cylindrical version of a fuel cell according to the invention.

FIG. 9 shows a cross sectional view of a cylindrical version of a fuel cell. In this case the non-planar substrate 212 is shaped in the form of a cylinder to enclose a volume 210. The fuel cell in this figure is shown with fuel 11 in the enclosed volume 210 providing fuel to the fuel cell. In this configuration the ambient environment outside the cell supplies oxidant. It is also envisioned that oxidant be contained within the enclosed volume 210 and that the ambient environment supply the fuel.

Figure 10:
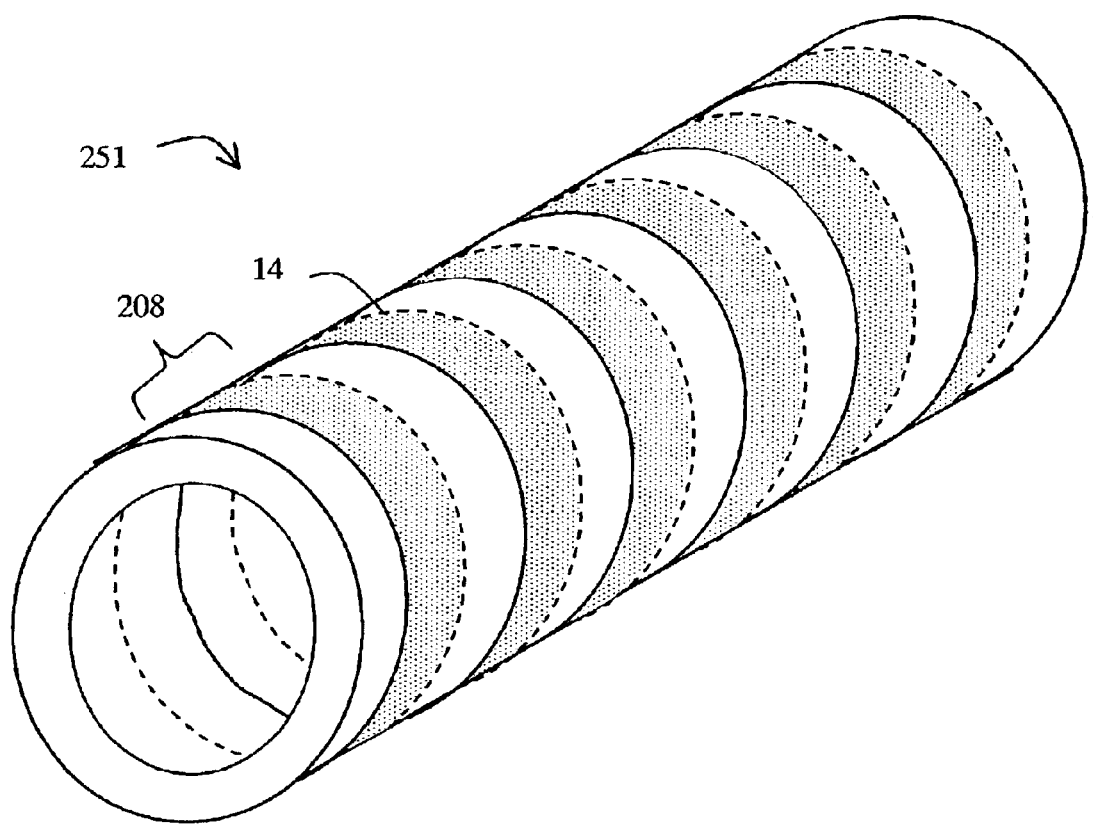
FIG. 10 is another embodiment of the inventive fuel cell of the invention with the channels in the form of a set of stacked annular rings.

FIG. 10 is another embodiment of a cylindrical fuel cell 251 having the channels 14 of the non-planar fuel cells 208 configured radially and orthogonal to the axis of the cylinder. It is understood that the fuel cells 208 within this figure can either be constructed and assembled, as described for FIG. 4 or that they be formed within a single cylindrical substrate as described for FIG. 5.

Figure 11:
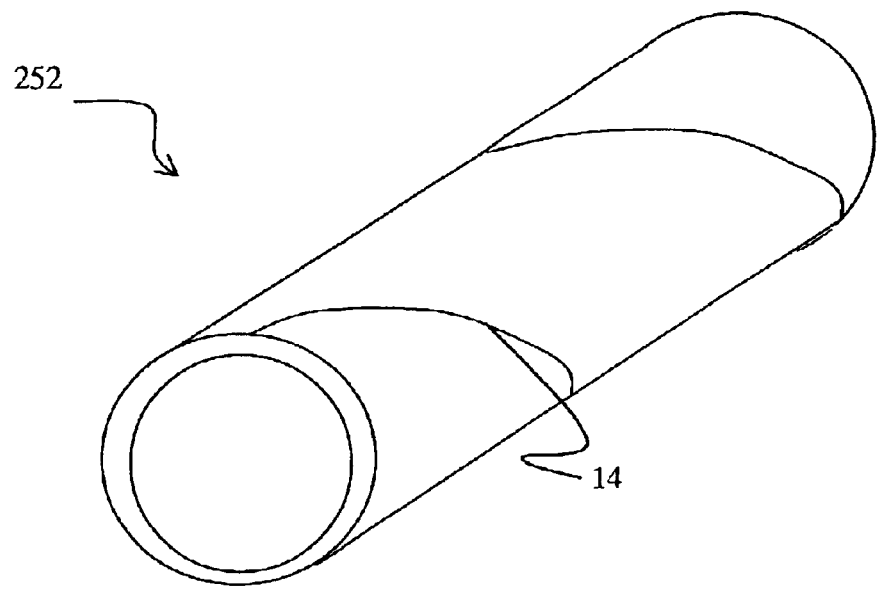
FIG. 11 is another embodiment of the inventive fuel cell with the channels in the form of a spiral around the cylinder.

FIG. 11 is another embodiment of a cylindrical fuel cell 252 having the channel 14 of the non-planar fuel cell disposed in a wound or spiral fashion around the perimeter of the cylinder. Although, in this figure, only a single spiral channel 14 is shown, multiple fuel cells with multiple channels could be formed using the porous substrate.

Although only cylindrical cells have been shown enclosing a volume it is contemplated herein that shapes such as extruded rectangles, squares, ovals, triangles and other shapes as well as non-extruded shapes such as cones, pyramids, football shaped objects and other shapes that enclose a volume are included as part of the invention.

Figure 12:
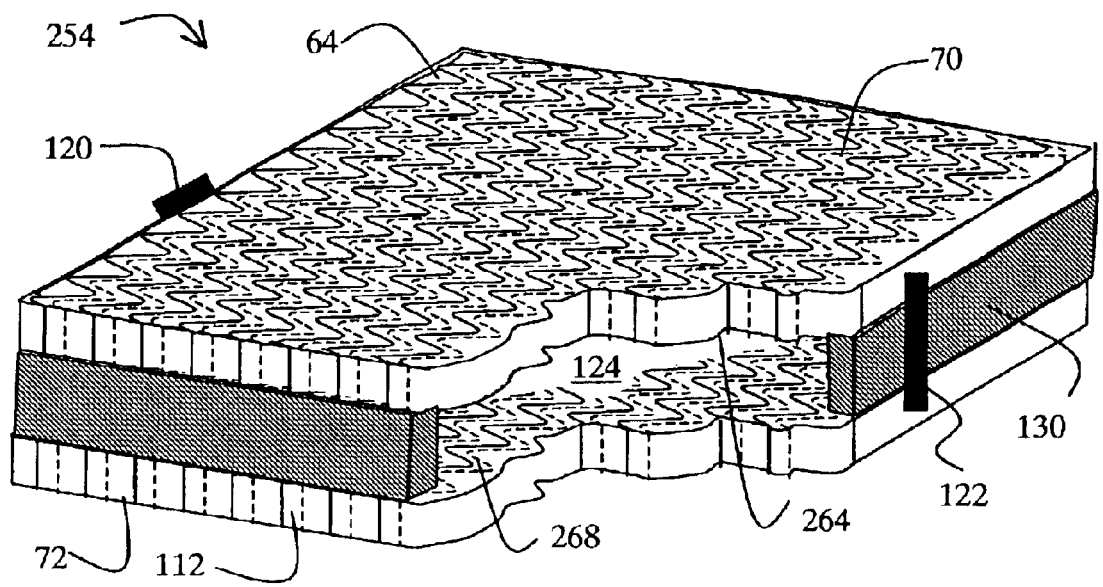
FIG. 12 is a perspective view of a bi-level fuel cell structure.

FIG. 12 is a cutaway perspective view of a bi-level fuel cell layer structure 254 with two fuel cell layers, a first fuel cell layer 64 and a second fuel cell layer 112 each comprising an anode side and a cathode side wherein said first fuel cell layer 64 is stacked on top of said second fuel cell layer 112 such that the anode side 264 of the first fuel cell layer and the anode side 268 of the second fuel cell layer adjoin.

In this Figure, a seal 130 is disposed between the first and second fuel cell layer to form a fuel plenum 124. The two positive electrical connections are connected to positive connector 120 and the two negative electrical connections are connected to negative connector 122 so that the individual fuel cell layers are now connected in an electrically parallel configuration. The resulting assembly is a bi-level fuel cell layer structure 254 having a top 70 and a bottom 72, the top and bottom being the cathode sides of the respective fuel cell layers. The resulting structure is an enclosed plenum air breathing fuel cell that achieves a series electrical connection of the individual fuel cells in each fuel cell layer and a parallel electrical connection of the two fuel cell layers. Only fuel is required to be fed to the interior of the structure and electrical current flows within the two fuel cell layers independently of one another. There is no electrical connection between the two fuel cell layers except at the parallel connection of the positive and negative electrical connections at either end of the fuel cell layers in the structure.

It is also envisioned that the fuel cell layers be placed cathode to cathode thereby creating a common plenum that can be filled with oxidant. In this configuration the fuel cell sandwich uses the ambient environment as a fuel supply.

Although various materials could be used for the porous substrate of the invention, one usable material could be a conductive material. Materials such as a metal foam, graphite, graphite composite, at least one silicon wafer, sintered polytetrafluoroethylene, crystalline polymers, composites of crystalline polymers, reinforced phenolic resin, carbon cloth, carbon foam, carbon aerogel, ceramic, ceramic composites, composites of carbon and polymers, ceramic and glass composites, recycled organic materials, and combinations thereof are contemplated as usable in this invention.

The channel is contemplated to have up to 50 optional support members separating the walls of the channel. The support members can be located at the extreme ends of the channel, such as forming a top or bottom, or can be located in the middle portion of the channel, or be oriented at an angle to the center of the channel. It is contemplated that the support member can be an insulating material. If an insulating material is used, it is contemplated that silicon, graphite, graphite composite, polytetrafluoroethylene, polymethamethacrylate, crystalline polymers, crystalline copolymers, cross-linked polymers thereof, wood, and combinations thereof can be usable in the invention.

Dimensionally, the channel can have a dimension ranging from 1 nanometer to 10 cm in height, 1 nanometer to 1 mm in width and from 1 nanometer to 100 meters in length.

A single fuel cell of the invention, optionally within a fuel cell layer, is contemplated of being capable of producing between approximately 0.25 volts and approximately 4 volts. Between 1 and 5000 fuel cells are contemplated as usable in one fuel cell layer in this design, however in a preferred embodiment, the fuel cell layer has between 75 and 150 joined fuel cells. This fuel cell layer is contemplated to be capable of producing a voltage between 0.25 volts and 2500 volts. A fuel cell with more channels will be capable of producing higher voltages.

The invention can be constructed such that the fuel comprises a member of the group: pure hydrogen, gas containing hydrogen, formic acid, an aqueous solution comprising a member of the group: ammonia, methanol, ethanol and sodium borohydride, and combinations thereof. The invention can be constructed such that the oxidant comprises a member of the group: pure oxygen, gas containing oxygen, air, oxygen enriched air, and combinations thereof.

Electrolyte usable in this invention can be a gel, a liquid or a solid material. Various materials are contemplated as usable and include: a perfluoronated polymer containing sulphonic groups, an aqueous acidic solution having a pH of at most 4, an aqueous alkaline solution having a pH greater than 7, and combinations thereof. Additionally, it is contemplated that the electrolyte layer can be between 1 nanometer and 1.0 mm in thickness, or alternatively simply filling each undulating channel from first wall to second wall without a gap.

The fuel cell is manufactured using a first and second coating on the porous substrate. These coatings can be the same material or different materials. At least one of said coatings can comprise a member of the group: polymer coating, epoxies, polytetrafluoro ethylene, polymethyl methacrylate, polyethylene, polypropylene, polybutylene, and copolymers thereof, cross-linked polymers thereof, conductive metal, and combinations thereof. Alternatively, the first or second coating can comprise a thin metallic layer such as a coating of gold, platinum, aluminum or tin as well as alloys of these or other metals or metallic combinations.

The first and second catalyst layers that are contemplated as usable in the invention can be a noble metal, alloys comprising noble metals, platinum, alloys of platinum, ruthenium, alloys of ruthenium, and combinations of these materials. It is contemplated that ternary alloys having at least one noble metal are usable for good voltage creation. Platinum-ruthenium alloys are also contemplated as usable in this invention. The catalyst layers should each have a catalyst loading quantity wherein the amount of catalyst may be different for each layer.

The material for said optional sealant barriers contemplated herein can be selected from the group comprising: silicon, epoxy, polypropylene, polyethylene, polybutylene, and copolymers thereof, composites thereof, and combinations thereof.

One method for making the fuel cell contemplates the following steps:
a. forming a porous substrate having a top and bottom having a first side and a second side;
b. coating at least a portion of said top with a first coating;
c. coating at least a portion of said bottom with a second coating;
d. forming a channel using the porous substrate, wherein said channel comprises a first channel wall and a second channel wall;
e. forming an anode by depositing a first catalyst layer on said first channel wall;
f. forming a cathode by depositing a second catalyst layer in said second channel wall;
g. disposing electrolyte in at least a portion of the channel contacting the anode and the cathode;
h. attaching a positive electrical connection on one end to the first side of said porous substrate, and attaching a negative electrical connection on one end to said second side of said porous substrate;
i. attaching a fuel plenum to the porous substrate forming a fuel cell;
j. attaching an oxidant plenum to the porous substrate;
k. disposing a sealant barrier around at least a portion of said fuel cell; and
l. loading said fuel plenum with fuel and said oxidant plenum with oxidant.

The sequence of operations described may be varied and steps combined as required to suit the particular material requirements and fabrication processes used. As well, the method can comprise forming between one and 250 or more channels in said porous substrate.

Another method for forming a fuel cell envisioned in the invention contemplates the following steps:
a. repeating steps a through h of the method above as many times as needed prior to joining the porous substrate to the fuel plenum forming at least one additional fuel cell;
b. securing the porous substrate at the sealant barriers to at least on additional fuel cell at its sealant barrier forming a fuel cell layer and extending said fuel cell layer securing additional formed fuel cells to the fuel cell layer at respective sealant barriers;
c. attaching the positive electrical connections and the negative electrical connections of the fuel cell layer together;
d. attaching the joined fuel cells to said fuel plenum; and
e. attaching the joined fuel cells to said oxidant plenum.

The positive electrical connections and the negative electrical connections of said fuel cells within the fuel cell layer can be connected in series, in parallel or in a combination of series and parallel.

Yet another method for making a fuel cell layer is contemplated which has the steps of:
a. forming a porous substrate comprising a top and bottom, a first side and a second side;
b. coating at least a portion of said top with a first coating;
c. coating at least a portion of said bottom with a second coating;
d. forming a plurality of distinct channels using the porous substrate, wherein each distinct channel comprises a first channel wall and a second channel wall;
e. forming a plurality of anodes by depositing a plurality of first catalyst layers on said first channel walls;
f. forming a plurality of cathodes by depositing a plurality of second catalyst layers in said second channel walls;
g. disposing electrolyte in at least a portion of each distinct channel;
h. disposing a first sealant barrier on at least a portion of said first side;
i. disposing a second sealant barrier on at least a portion of said second side;
j. forming a plurality of third sealant barriers between each of said distinct channels creating a plurality of independent fuel cells adjacent each other in the porous substrate;
k. attaching a positive electrical connection to the first side of said porous substrate;
l. attaching a negative electrical connection to said second side of said porous substrate;
m. attaching a fuel cell positive electrical connection to each independent fuel cells
n. attaching a fuel cell negative electrical connection to each independent fuel cell forming a fuel cell layer; and
o. disposing a sealant barrier around at least a portion of said fuel cell layer.

In any of the methods described above a number of different methods of forming said porous substrate are contemplated herein. The porous substrate can be formed by a method that is a member of the group comprising: casting and then baking, slicing layers from a pre-formed brick, molding, extruding, and combinations thereof. The formed porous substrate may be non-planar or enclose a volume.

If at least one of the coatings is deposited with thin film deposition techniques, the technique may include a member of the group comprising: sputtering, electroless plating, electroplating, soldering, physical vapor deposition, chemical vapor deposition. If at least one of the coatings is an epoxy coating the coating can be disposed on said substrate by a method selected from the group: screen printing, ink jet printing, spreading with a spatula, spray gun deposition, vacuum bagging and combinations thereof A mask can be used when applying said coatings to said porous substrate. If required, a portion of the coating can be removed prior to adding the electrolyte.

The channel can be formed in the porous substrate by a method selected from the group comprising: embossing, ablating, etching, extruding, laminating, embedding, melting, molding, cutting, and combinations thereof. If etching is used, the etching can be by a method selected from the group comprising: laser etching, deep reactive ion etching, and alkaline etching. Alternatively, it is anticipated the channels can be formed by micro-milling using laser cutting, high pressure waterjets, micro-dimensioned rotary tools or mechanical dicing saws.

Within the invention it is envisioned to deposit the electrolyte in said channel using a method that is a member of the group comprising: pressure injection, vacuum forming, hot embossing, and combinations thereof.

The variations for making the apparatus can be implemented into any of the methods described above. For example, the method can contemplate using a conductive material for the sealant barrier and/or an insulation material for the support member.

The fuel cell of the invention can be used by first, connecting a fuel source to a fuel plenum inlet; second, connecting a fuel plenum outlet to a re-circulating controller; third, connecting an oxidant plenum inlet to an oxidant source; fourth, connecting an oxidant plenum outlet to a flow control system, fifth, connecting a positive electrical connection and a negative electrical connection to an external load; sixth, flowing fuel and oxidant to the inlets; and finally, driving load with electricity produced by the fuel cell.

If a dead-ended version of the fuel cell is used the operation is much simpler. First, the fuel inlet is connected to a fuel supply, second, the oxidant inlet is connected to an oxidant supply, third, the positive electrical connection and the negative electrical connection are connected to an external load; and finally, the load is driven with electricity produced by the fuel cell.

The method of the invention can further comprise the step of sealing the plenum outlets and inlets after the fuel and oxidant is loaded into their respective plenums creating a dead ended fuel cell. The fuel cell can then be connected to an external load using the positive and negative electrical connections and used to drive the external load.

It is envisioned within this invention to use any combination of fuel and oxidant inlets and outlets to operate the fuel cell.

the invention has been described in detail with particular reference to certain preferred embodiments thereof, but it will be understood that variations and modifications can be effected within the scope of the invention.

What is claimed is:

1. A fuel cell layer for connecting to an external load comprising:
   a. a fuel plenum comprising fuel;
   b. an oxidant plenum comprising oxidant;
   c. a porous substrate communicating with said fuel plenum and said oxidant plenum, wherein said porous substrate further comprises a top, a bottom, a first side and a second side;
   d. a plurality of fuel cells formed using said porous substrate, each fuel cell comprising:
      i. a distinct channel comprising a first channel wall and a second channel wall;
      ii. a first catalyst layer disposed on said first channel wall;
      iii. a second catalyst layer disposed on said second channel wall;
      iv. an anode formed from said first catalyst layer and an cathode formed from said second catalyst layer;
      v. an electrolyte disposed in said distinct channel to prevent transfer of fuel to the cathode and to prevent transfer of oxidant to the anode;
   e. a first coating disposed on at least a portion of said porous substrate to prevent fuel from entering a portion of said porous substrate;
   f. a second coating disposed on at least a portion of said porous substrate to prevent oxidant from entering a portion of said porous substrate;
   g. a first sealant barrier disposed on the first side;
   h. a second sealant barrier disposed on the second side;
   i. a third sealant barrier disposed between said fuel cells;
   j. a positive electrical connection disposed on said first side; and
   k. a negative electrical connection disposed on said second side.

2. The fuel cell layer of claim 1, wherein said anodes formed from said first catalyst layers are disposed in the porous substrate of said first channel walls; and said cathodes formed from said second catalyst layers are disposed in the porous substrate of said second channel walls.

3. The fuel cell layer of claim 2, wherein said first and second catalyst layers are disposed in the porous substrates at least at a minimum depth to cause catalytic activity.

4. The fuel cell layer of claim 1, wherein said channels are formed within said porous substrates.

5. The fuel cell layer of claim 4, wherein said channels are formed using a technique selected from the group consisting of cutting, ablating, molding, etching, extruding, embossing, laminating, embedding, melting, and combinations thereof.

6. The fuel cell layer of claim 1, wherein at least one of said channels is undulating.

7. The fuel cell layer of claim 1, wherein at least one of said channels is in at least three planes.

8. The fuel cell layer of claim 1, wherein said oxidant comprises a member of the group consisting of pure oxygen, gas containing oxygen, air, oxygen enriched air, and combinations thereof.

9. The fuel cell layer of claim 1, wherein said fuel comprises a member of the group consisting of pure hydrogen, gas containing hydrogen, formic acid, and an aqueous solution, wherein the aqueous solution is a member the group consisting of ammonia, methanol, ethanol, and sodium borohydride and combinations thereof.

10. The fuel cell layer of claim 1, wherein said porous substrate comprises a planar shape.

11. The fuel cell layer of claim 1, wherein said porous substrate comprises a shape that encloses a volume.

12. The fuel cell layer of claim 1, wherein said shape of said porous substrate comprises a cylinder.

13. The fuel cell layer of claim 1, wherein said porous substrate is a conductive material.

14. The fuel cell layer of claim 1 wherein said porous substrate comprises a member of the group consisting of a metal foam, graphite, graphite composite, at least one silicon wafer, sintered polytetrafluoroethylene, crystalline polymers, composites of crystalline polymer, reinforced phenolic resin, carbon cloth, carbon foam, carbon aerogel, ceramic, ceramic composites, composites of carbon and polymers, ceramic and glass composites, recycled organic material, and combinations thereof.

15. The fuel cell layer of claim 1, wherein at lest one of said fuel cells further comprises: a support member disposed between the first channel wall and the second channel wall, and said support member comprises a member of the group consisting of silicon, graphite, graphite composite, polytetrafluoroethylene, polymethamethacrylate, crystalline polymers, crystalline copolymers, cross-linked polymers thereof, wood, and combinations thereof.

16. The fuel cell layer of claim 1, further comprising a fuel plenum outlet connected to said fuel plenum.

17. The fuel cell layer of claim 1, further comprising a fuel plenum inlet connected to the fuel plenum.

18. The fuel cell layer of claim 1, further comprising an oxidant plenum inlet in communication with the oxidant plenum.

19. The fuel cell layer of claim 1, further comprising an oxidant plenum outlet in communication with the oxidant plenum.

20. The fuel cell layer of claim 1, wherein said fuel plenum comprises a permeable material.

21. The fuel cell layer of claim 1, wherein said fuel plenum comprises a solid material with a flow field.

22. The fuel cell layer of claim 1, wherein said fuel plenum is open to an ambient environment.

23. The fuel cell layer of claim 1, wherein at least one of said fuel cells comprises an electrolyte selected from the group consisting of: a perfluoronated polymer containing sulphonic groups, an aqueous alkaline solution having a ph of greater than 7, an aqueous acidic solution having a ph of at most 4, and combinations thereof.

24. The fuel cell layer of claim 1, wherein said first and second coatings are of the same material.

25. The fuel cell layer of claim 1, wherein said first coating and said second coating comprises different materials.

26. The fuel cell layer of claim 1, wherein at least one of said coatings comprises a member of the group consisting of polymer coating, epoxies, polytetrafluoro ethylene, polymethyl methacrylate, polyethylene, polypropylene, polybutylene, and copolymers thereof, cross-linked polymers thereof, conductive metal and combinations thereof.

27. The fuel cell layer of claim 1, wherein at least one of said catalyst layers is a member of the group consisting of noble metals, alloys comprising noble metals, platinum, alloys of platinum, ruthenium, alloys of ruthenium, and combinations thereof.

28. The fuel cell layer of claim 27, wherein at least one of said catalyst layers is a ternary alloy comprising at least one noble metal.

29. The fuel cell layer of claim 27, wherein at least one of said catalyst layers is platinum.

30. The fuel cell layer of claim 27, wherein at least one of said catalyst layers is a platinum-ruthenium alloy.

31. The fuel cell layer of claim 27, wherein at least one of said catalyst layers has a different catalyst loading quantity from other catalyst layers.

32. The fuel cell layer of claim 1 wherein at least one of said channels has a dimension ranging from 1 micron to 10 cm in height, 1 nanometer to 1 mm in width, and from 1 nanometer to 100 meters in length.

33. The fuel cell layer of claim 1, wherein said fuel cell layer produces a voltage between approximately 0.25 volts and approximately 2500 volts.

34. The fuel cell layer of claim 1, wherein said fuel plenum has a rectangular cross-section.

35. The fuel cell layer of claim 1, wherein said oxygen plenum comprises a permeable material.

36. The fuel cell layer of claim 1, wherein said oxygen plenum comprises a solid material with a flow field.

37. The fuel cell layer of claim 1, wherein said oxygen plenum is open to an ambient environment.

38. The fuel cell layer of claim 1, wherein said fuel cell layer comprises between 1 and 5000 fuel cells.

39. The fuel cell layer of claim 38, wherein said fuel cell layer comprises between 75 and 150 fuel cells.

* * * * *